United States Patent [19]

McLaughlin

[11] 4,007,338
[45] Feb. 8, 1977

[54] SWITCHING AND TRANSMISSION TECHNIQUE USING A METHOD AND ARRANGEMENT OF CHANNEL ALLOCATION FOR PROVIDING CONFERENCING

[75] Inventor: Donald W. McLaughlin, Bolingbrook, Ill.

[73] Assignee: GTE Automatic Electric Laboratories Incorporated, Northlake, Ill.

[22] Filed: Sept. 18, 1975

[21] Appl. No.: 614,407

[52] U.S. Cl. .................. 179/18 BC; 179/15 AT; 179/18 FC

[51] Int. Cl.² ............................................. H04M 3/56

[58] Field of Search .... 179/15 AT, 15 AQ, 15 BW, 179/15 AL, 18 FC, 1 CN, 18 BC

[56] References Cited
UNITED STATES PATENTS

| | | | |
|---|---|---|---|
| 3,171,896 | 3/1965 | Bartlett | 179/15 AT |
| 3,492,435 | 1/1970 | Inose | 179/18 FC |
| 3,504,123 | 3/1970 | Fischer | 179/15 AT |
| 3,508,007 | 4/1970 | Goodall | 179/18 BC |
| 3,517,135 | 6/1970 | Fisch | 179/15 AT |
| 3,699,264 | 10/1972 | Pitroda | 179/18 BC |
| 3,748,394 | 7/1973 | Thomas | 179/18 BC |
| 3,883,697 | 5/1975 | Brown | 179/18 BC |

*Primary Examiner*—David L. Stewart
*Attorney, Agent, or Firm*—Robert J. Black

[57] ABSTRACT

Most PCM systems provide non-blocking switching, with a channel per each terminal equipment being provided. In other words, they are dedicated channel arrangements. The present invention relates to PCM system using a method and arrangement which is a condensation of the required channels provided to time division switching by distribution of the channels instead of the usual dedicated channel method. In this system, a channel memory is created and provided to provide for control of which terminal equipments are allotted which channels (on a per call basis).

14 Claims, 24 Drawing Figures

CPU CONTROL CIRCUIT 1200

SWITCHING AND TRANSMISSION TECHNIQUE USING A METHOD AND ARRANGEMENT OF CHANNEL ALLOCATION FOR PROVIDING CONFERENCING

BACKGROUND OF THE INVENTION

1. Field of the Invention

This invention relates generally to switching and transmission techniques in telephone communication systems, and more particularly to an improved switching technique for connecting several pulse code modulated channels in a typical PCM system for conferencing. More particularly still, the invention relates to an improved switching and transmission technique for use in such a PCM system for reducing the common equipment required for a specified number of terminations, using a method and arrangement of channel allocation as compared to the usual dedicated channel arrangement.

2. Description of the Prior Art

In general, in most prior art systems wherein analog conference circuits are provided, the analog signals of all participants are compared and then all signals to an individual participant with the exception of the signals generated by that individual himself are extended. A variety of schemes such as direct multiplexing, hybrid repeaters, transistorized analog circuitry, etc. have been utilized. Various solutions to the problems of cross talk, echo loss, impedance matching, sidetone, etc. have been disclosed. Some of the techniques employed are shown in U.S. Pat. No. 3,116,369; 3,144,518; 3,170,042 and 3,301,962. None of the techniques disclosed employ the digital approach and hence are of little significance in the field of pulse code modulated telephony. A conference circuit for a time division multiplex telephone communication system is disclosed in U.S. Pat. No. 3,551,600. In this disclosure, digital techniques are employed. However, the time division signals are still in analog form and after being acted upon by the conference circuit, they must be reconverted from digital to analog form.

In U.S. Pat. No. 3,699,264, there is disclosed an algorithm for providing digital pulse code modulated conferences. In the disclosed system, during every time frame, an active speaker sample is sought. The active speaker is identified by comparing each participant's digital sample during the following time frame. The active speaker sample is transmitted to all participants in the conferencing arrangement. A last speaker sample is transmitted to the active speaker. With this approach, a 3-way conferencing per circuit is possible in its digital form.

While the arrangement disclosed in this U.S. Pat. No. 3,699,264 has found application in various systems, in existing commercial PABX systems having a large number of trunks, a very large number of 3-way conferencing circuits would be required. Accordingly, it would be desirable to provide in such systems, a 3-way conferencing facility through the switching network. As indicated above, one aspect of the present invention relates to such a switching technique for connecting several pulse code modulated channels for conferencing.

Presently known all-time pulse code modulated systems generally are arranged with the transmit side of each inlet appearing in a fixed position on one side of the switching network, and with the receive side of each inlet appearing in a fixed position on the other side thereof. The operation is such that all information entering from the input pulse code modulated (PCM) bus is stored and made available at the output under the control of a control memory which contains information regarding all network connections.

More particularly, in such systems, in a normal operation, each channel arriving on the input bus is written cyclically into a fixed location in an information memory. At this time, the control memory word corresponding to that channel is read for addressing the information memory. The content of the information memory at this address (which represents a PCM sample from the channel engaged in a conversation with the other channel) is read out. The same operation of writing the information memory, reading the control memory for the information memory address, and reading the information memory is performed during the other channels time slot. In any given channel location, the control memory contains the address of the channel to which it is to be connected. Such all-time PCM systems do not have the ability to provide a double connection for conferencing.

SUMMARY OF THE INVENTION

In accordance with the present invention, conferencing can be provided in such a PCM system by providing two additional circuits, namely, a second control memory and a comparison logic circuit. With the addition of these two circuits, the operation is such that two words corresponding to two channels are read from the information memory every time slot, and after proper comparison, the largest sample is transmitted to the third channel. In other words, assuming, for example, that channels 3, 5 and 9 are engaged in a 3-way conference, during the channel 3 time slot, the samples from channel 5 and channel 9 are read and compared, and the larger of the two samples is transmitted to channel 3. Subsequently, during the channel 5 time slot, the samples from channel 3 and channel 9 are read and compared, and the larger of the two samples is transmitted. During the channel 9 time slot, the operation is repeated, with the largest of the channel 3 and 5 samples being transmitted. It can be seen that during each channel time slot, the incoming information is written into the fixed channel number in the information memory and the outgoing information is read from some other channel specified in the control memory. This operation of writing and reading the information memory goes on continuously during each channel. The next time frame, new PCM samples are written into the information memory.

With this arrangement and technique, several advantages result, including the fact that it provides 3-way calling facility with a minimum of hardware and provides 3-way calling ability per port. Also, since the 4-wire PCM network has the ability to switch transmit and receive ports separately, 3-way calling in any desired direction is possible. In other words, it is possible to provide a call waiting tone to just one of the subscribers in a normal conversation. The same ability is also provided for consultation. The comparison and other signal processing is performed on line. Maximum advantage is taken of the existing information memory and other addressing circuits, and only one additional control memory and comparison logic is required to perform the conferencing function. The addition of 3-way calling ability does not disturb normal network connection, and the arrangement furthermore is expandable along with the network. In view of the centralized 3-way calling ability, a single source such as a call waiting tone can be connected for all possible double connections. The system is all digital, using only digital circuits, and further can be used with the D2 encoding format with logarithmic characteristics. Since it is digital, the problems related to loading, impedance matching, etc. are irrelevant.

The above generally described PCM system provides non-blocking switching, with a channel per each terminal equipment being provided. In other words, it is a dedicated channel arrangement. In many applications such as, for example, with a small EPABX where less than 10 ccs of traffic is common, an improvement in the switching concept can be provided in the form of smaller system costs and size (physical) at the same transmission levels but at the expense of flexibility. The reduction in flexibility is a result of making the system blocking to an extent, however, in systems such as a small EPABX, no real flexibility is lost since no real requirement for a non-blocking system exists.

In accordance with the present invention, such a system can be provided by using a method and arrangement which is a condensation of the required channels provided to time division switching by distribution of the channels instead of the usual dedicated channel method. In this system, a channel memory is created and provided to provide for control of which terminal equipments are allotted which channels (on a per call basis). In the hereinafter disclosed system, the channel memory has 96 locations and each location stores the associated equipment which has been allocated that channel. The control of the channel memory (data update) is performed by a call processor unit (CPU) when connections are established or removed. The memory, however, also constantly is cyclically read and the associated equipment is given a channel transmit and receive pulse as long as its identity is stored in the memory. The distribution of these pulses is actually a decode of the memory read out, with the latter being stored external to the memory for a specified time. Each equipment decodes this data to see if it corresponds to its identity. If it does, that equipment is enabled as long as the storage contains its identity.

Accordingly, it is an object of the present invention to provide an improved switching technique for connecting several pulse code modulated channels in a typical PCM system for conferencing.

More particularly, another object is to provide an improved switching and transmission technique for use in such a PCM system for reducing the common equipment required for a specified number of terminations using a method and arrangement of channel allocation.

GENERAL DESCRIPTION

Figure 1:
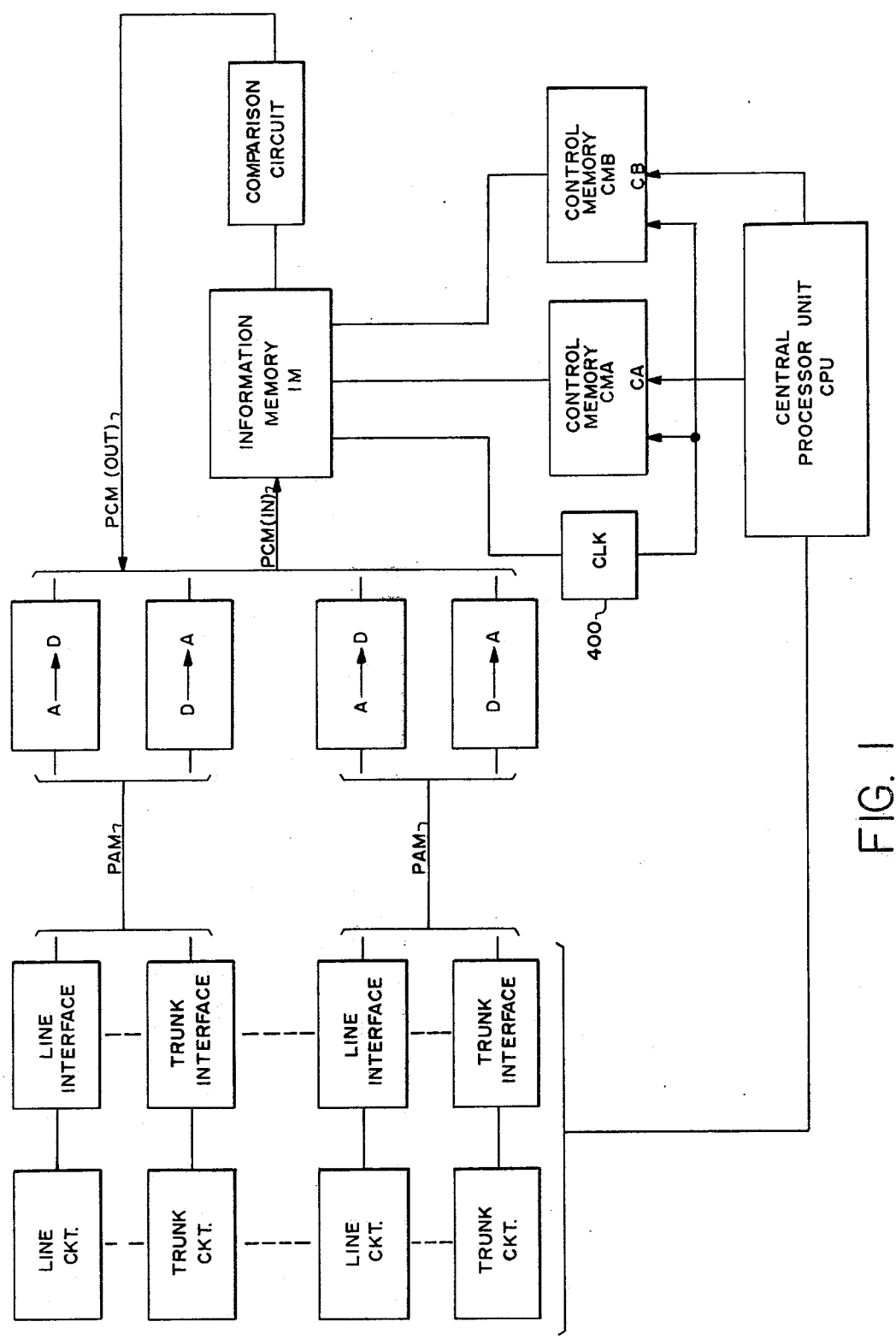
FIG. 1 is a block diagram schematic of a telephone communication system employing an improved switching technique for connecting several pulse code modulated channels in a typical PCM system for conferencing, in accordance with a first embodiment of the invention.

Referring now to the drawings, in FIG. 1 there is illustrated a stored program digital PCM-EPABX system which can be divided into four main blocks, namely, a PCM interface, a PCM network, a number of miscellaneous circuits, and a control complex. The PCM interface consists of the line and trunk interfaces, the analog to digital (A/D) and digital to analog (D/A) converters and their associated multiplexers, and provides analog to PCM and PCM to analog conversions and the necessary time division multiplexing. The all-time nonblocking PCM network, with full availability, consists of an information memory, a clock, two control memories and a comparison circuit, and switches (in time) the coded information received from the PCM interface. The miscellaneous circuits, for purposes of clarity are not shown, but include all of the required service circuits, such as tone generators, tone receivers, conference circuits and circuitry for turret control. The control complex consists of the microprocessor or central processor unit (CPU) and the instruction and process stores. The CPU has direct access to the lines, trucks and miscellaneous circuits for scanning and control; and to the PCM network for establishing the connections.

The analog information from a subscriber is amplified, and sampled (at 8 KHZ) at the line interface. The sampled information from 24 line and trunk interface circuits is combined together to form a 24 channel PAM (pulse amplitude modulated) bus. An analog to digital (A/D) converter accepts this 24 channel PAM bus and outputs an 8 bit binary representation for each PAM sample. The information from all such A/D converters is multiplexed to form a single PCM bus. It is this PCM bus which is presented as an input to the PCM network for switching.

On the outgoing side, the information on the PCM bus to the D/A converters is demultiplexed into separate 24 channel buses for the digital to analog (D/A) conversion. The D/A converters accept the 8 bit binary words and convert them to individual PAM samples on the PAM buses. From these PAM buses, the line and trunk interface circuits receive appropriate PAM samples through a receive gate; and after proper filtering, produce an analog waveform.

In this system, each subscriber requires one two-way channel (incoming and outgoing, or transmit and receive) for a normal conversation. Any port providing analog information to be switched requires one channel on the an A/D converter and thus occupies a single channel on the incoming PCM bus and thus requires a channel on a D/A converter.

With reference to the PCM network, the transmit side of each inlet appears in a fixed position on the left (of the information memory) while the receive side of each inlet appears in a fixed position on the right. The basic idea is that all information entering from the input bus is stored and made available at the output under control of control memories.

The information memory is addressable either from the system clock for writing purposes or from the control memories CA and CB for reading purposes. Of the two control memories provided, control memory CA controls the normal network connection, and control memory CB controls any additional connection necessary for providing features such as consultation, etc. (generally referred to as a double connection).

The control memories CA and CB are written at random from the central processor unit (CPU) and contain information necessary to set up a network connection. These memories are read cyclically under the control of the system clock.

In a given channel location, the control memory contains the address of the channel to which it is to be connected. For example, if channel 5 is to be connected to channel 107, the control memory in word 5 contains the binary equivalent of the number 107 and it contains in word 107 the binary equivalent of the number 5. Since the purpose is to connect any two of, for example, 512 channels, the control memory requires 9 bits for addressing the information memory and 512 channel words for outpulsing (512 × 8).

The use of 512 word memories is for use as an example only. Other system parameters may affect the actual number of time slots on the incoming bus and/or the number of words in the network memories. For example, a system requirement for the ability to be slave synchronized to an incoming T1 line may dictate that the incoming bus contain 576 channels (192 × 3).

In a normal operation, each channel arriving (say 5) on an input bus is written cyclically into a fixed location in the information memory. At the same time, the control memory CA corresponding to that channel (5) is read for addressing the information memory. The content of the information memory at this address (which represents a PCM sample from the channel engaged in a normal conversation with channel 5) is read out. After this operation, channel 5 from the control memory CB is read for addressing the information memory. The control memory CB provides a PCM sample from the channel engaged in a double connection. These two samples are compared by the comparison circuit, and the sample with the highest magnitude is sent to channel 5. If there is no double connection required, the control memory CB contains a dummy number in channel 5. In other words, during each channel time the incoming information is written into the fixed channel number in the information memory and the outgoing information is read from some other channel specified by the control memory. This operation of writing and reading the information memory goes on continuously during each channel. The next time frame (after 125 $\mu$sec.) new PCM samples are written in the information memory.

It should be evident that during each channel time (244$\mu$sec.) three operations are performed:

1. Write information memory IM under the control of the clock.
2. Read information memory IM at the address provided by control memory CA.
3. Read information memory IM at the address provided by control memory CB. It should also be evident that the information memory is written cyclically and read at random while the control memories CA and CB are read cyclically and written at random.

The comparison circuit compares two PCM samples obtained by addressing the control memory CA and CB. Of theses two, the one with the larger magnitude is outpulsed on the PCM bus.

In the case of incoming through supervision, supervisory information from all lines and trunks is multiplexed in a group of 24 channels and brought to the corresponding A/D circuits. At this point, the information from the output of the A/D converter consists of 9 parallel bits (8 information bits + 1 supervision bit). The supervision from all A/D circuits in the system is further multiplexed. In other words, the 9th bit (the supervision bit) from all the lines, trunks and miscellaneous circuits is multiplexed on a single lead. This information is written into the 9th bit specifically provided for the supervision in the information memory IM. At this point, the supervisory information is concentrated and thus can be loaded into a dedicated register location for scanning purposes. If outgoing supervision is desired, the information from the output of the information memory IM is demultiplexed at the D/A converter and distributed to the corresponding line and trunk circuits. If additional real time is desired, hardware DP receivers could be easily implemented.

In this system, the service circuits, such as TCMF receivers, MF receivers, announcements, etc. are standard analog types. However, the tone senders are of the digital type. The proposed conference circuit is digital, and does not require PCM analog conversion for conferencing.

As indicated and generally described above, in accordance with the invention, conferencing is accomplished using digital techniques. The conference circuit is effectively attached across the network and thus does not require any active network ports. The conference is normally set by writing the network control memory, with the conference circuit address, in all participating channel locations. During the participating channel time the control memory indicates that the channel is engaged in a particular conference. At this time the PCM information from the incoming bus corresponding to that channel is written into the conference circuit and at the same time appropriate information is read out from the conference circuit for outpulsing on the outgoing PCM bus. In other words, the PCM conference circuit hangs across the incoming and outgoing PCM bus and is connected only under the control of the control memories.

The conference circuit advantageously uses what is known as Instant Speaker Algorithm. In this algorithm, the binary (PCM) word representing the PAM sample is not converted back to analog for conferencing. The entire process is digital, thus eliminating many of the problems normally encountered in analog circuits, such as, instability, loss, and impedance mismatching, and makes it suitable for a PCM digital exchange.

The instant speaker algorithm takes advantage of the high correlation between successive voice samples and a higher probability of finding no sample value at sampling instant in any normal conversation.

In an instant speaker algorithm, an active or present speaker sample is sought during every time frame. The channel with the largest binary number (highest PAM sample) is selected as the speaker. (Even though the T1 system uses a logarithmic characteristic, this criterion to identify a speaker is valid; the relative magnitude is still preserved with the non-linear encoding characteristics). The binary word representing this active speaker is transmitted to all other participants during the next frame, while the search for a new speaker continues. Instead of blocking the receive path of the active speaker while the sample is transmitted to all other participants the last speaker is transmitted to the active speaker. The last speaker is the one who was using the conference circuit before the present speaker was identified.

There may exist a situation where two or more participants present exactly the same binary information, corresponding to the highest PAM sample. In that case, the one with "built-in priority" will be processed and the other rejected; the priority may be determined by the algorithm selected or by the hardware implemented. The algorithm to select a speaker could be set up to compare the most significant bit of each channel or to compare up to the maximum number of bits of each channel. However, the magnitude selector algorithm that uses the maximum number of available bits in the code would add background noise with frequent switching between speakers. On the other hand, if a one or two-bit magnitude selector were used, the system would not switch often enough between speakers, and low-level phrases would be lost. (The low-level speaker would not be able to recapture the channel.) For optimum system performance, the number of bits to use in the magnitude selector algorithm is therefore selected with consideration of background noise and the frequency of switching speakers.

The highly desirable stored program control philosophy for the EPABX can be provided by utilizing a single chip MOS 8-bit parallel micro-processor, such as the Intel MCS-8008 micro-processor. A micro-computer system (MSC-8) can be formed when the MCS-8008 is interfaced with a standard semiconductor memory of up to 16K. Other comparable, commercially available, micro-processors and/or memories also can be utilized.

The processor or CPU communicates over an 8-bit data and address bus ($D_0$ through $D_7$) and uses two input leads (READY and INTERRUPT) and four output leads ($S_0$, $S_1$, $S_2$ and Sync) for control. Time multiplexing of the data bus allows control information, 14 bit addresses, and data to be transmitted between the CPU and external memory.

This CPU contains six 8-bit data registers, an 8-bit accumulator, two 8-bit temporary registers, four flag bits, and an 8-bit parallel binary arithmetic unit which implements addition, subtraction, and logical operations. A memory stack containing a 14-bit program counter and seven 14-bit words are used internally to store program and sub-routine addresses. The 14-bit address permits the direct addressing of 16K words of memory (any mix of RAM, ROM, or S.R.).

The control portion of the CPU contains logic to implement a variety of register transfer, arithmetic control, and logical instructions. Most instructions are coded in one byte (8 bits); data immediate instructions use two bytes; jump instructions utilize three bytes. When operating with a 500 kHz clock, the CPU executes non-memory referencing instructions in 20 microseconds.

All inputs (including clocks) are TTL compatible and all outputs are low-power TTL compatible.

The instruction set of the MCS-8008 consists of 48 instructions including data manipulation, binary arithmetic, and jump to sub-routine.

The normal program flow of the MCS-8008 may be interrupted through the use of the "INTERRUPT" control line. This allows the servicing of slot I/O peripheral devices while also executing the main program.

The "READY" command line synchronizes the MCS-8008 to the memory cycle allowing any type or speed of semiconductor memory to be used.

STATE AND SYNC outputs indicate the state of the processor at any time in the instruction cycle.

Interface between the CPU complex and the line circuits is provided by allowing the memory bus structure to be extended to the line multiplex components of each line circuit. A fourteen bit address bus is used to define which sense points or control points are to be read or controlled respectively. The memory data bus structure is used to receive or send the appropriate data from or to the respective sense or control points.

A given line circuit decides when to respond to the CPU by monitoring the address bus and comparing the address on the bus against a wired logic address wired in the backplane. When a comparison takes place, the common multiplex logic decodes the address to define whether a control or sensing operation is required and which of the four line circuit is being addressed.

The PCM line interface circuits and switching network can be viewed as functioning in a similar manner as in a 4-wire analog configuration where each transmit pair and each receive pair are controlled independently. This capability is used for supplying dial tone to the originating subscriber during the initial phase of touch calling signalling. After reception of the first digit, dial tone is dropped by opening the associated connection. The time slot address of the dial tone source and a receiver can be identical since the transmit and receive pair are controlled independently.

A single tone source is capable of supplying a number of inlets simultaneously with tone. Except for redundancy requirements for maintenance, a single tone source can supply tone to the entire office. Dial tone, ring back tone and MF tones all have this equivalent drive capability. The MF tones are turned on and off under processor control of the matrix to provide the sending requirements associated with CAMA sending.

The PCM-PABX incorporates a network having a four-wire characteristic in which the transmit and receive pair are controlled independently. This is an inherent characteristic which is not economically practical in any analog network. Conventionally PABX networks are structured so that their networks have two wires; or are of the four-wire type where the transmit and receive pair are controlled together. The PCM-PABX departure from the conventional PABX network along with the non-blocking full availability characteristic of the network, allows a given line to receive information from one source and send information to another independent source within the same time slot.

The overall construction and operation of the above generally disclosed and described stored program digital PCM-EPABX system can be better understood from the drawings and description below of the system generally illustrated in block diagram in FIG. 2. This system, while generally operating in the same manner as the system of FIG. 1, uses, in addition, a method and arrangement of channel allocation as compared to the dedicated channel arrangement of the system of FIG. 1. With the switching and transmission technique used in the system of FIG. 2, the common equipment required for a specified number of terminations can be substantially reduced.

Figure 2:
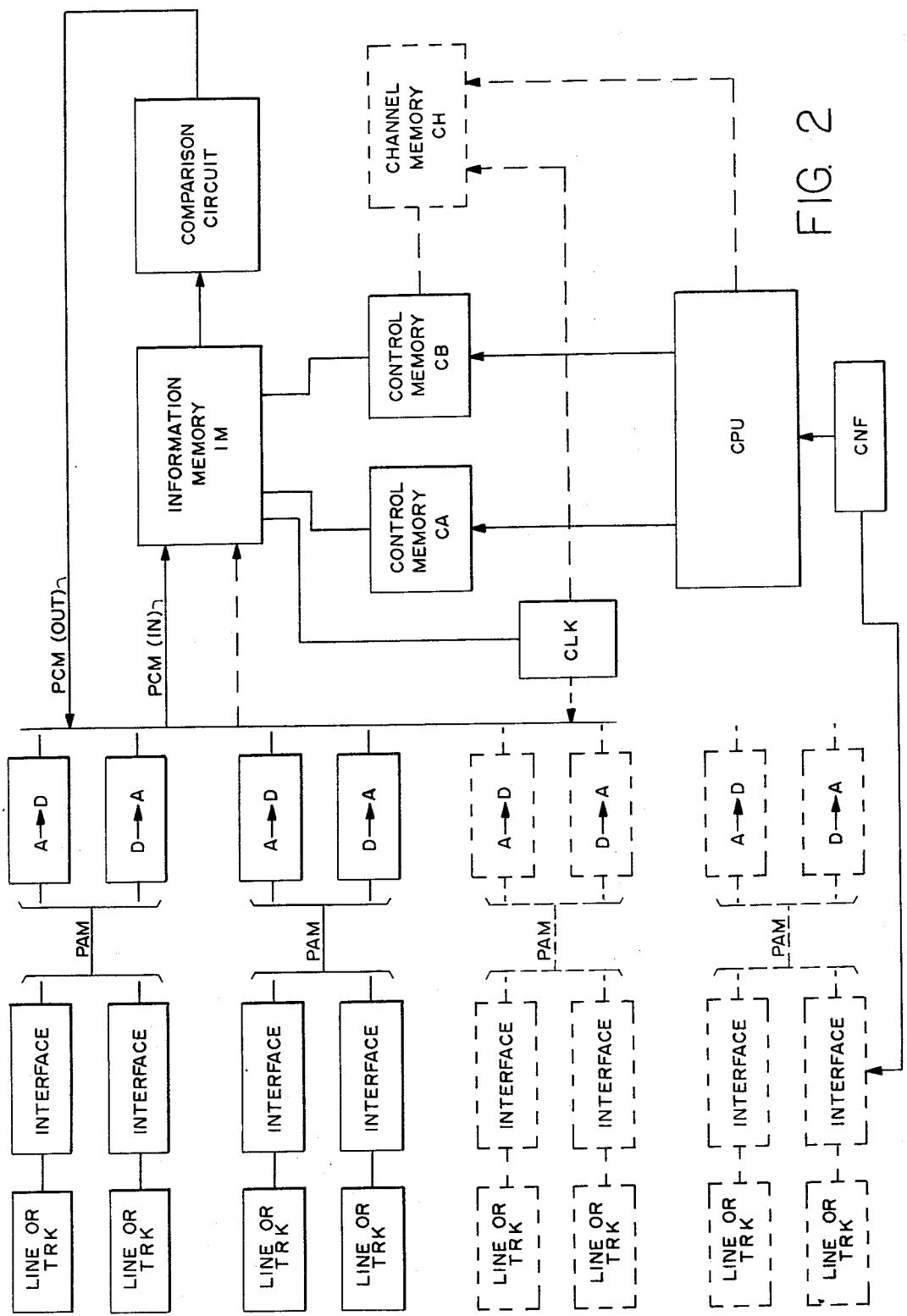
FIGS. 2 and 3 are block diagram schematic and an expanded block diagram schematic, respectively, of a PCM system employing an improved switching and transmission technique exemplary of a second embodiment of the invention, for reducing the common equipment required for a specified number of terminations, by using a method and arrangement of channel allocation as compared to the usual dedicated channel arrangement.

More particularly, it can be seen that the systems disclosed in FIGS. 1 and 2 are of generally the same construction, but that the system of FIG. 2 accommodates a greater number of terminations, i.e., lines, trucks, etc., shown in dashed lines, and further includes a channel memory CH (shown in dashed lines). In the illustrated embodiment which is fully described below, the system includes a total of approximately 163 terminations comprised of 120 line circuits, 30 trunk circuits, 5 digital tone sources, 5 DTMF receivers and an attendant station. Normally, in a system of the type illustrated in FIG. 1, this would require seven 24 channel units to provide a total of 168 dedicated channels. With the system of FIG. 2, the required number of channel units is reduced to three 24 channel units, or a total of 72 channels. A fourth dummy group of 24 channels is provided, of which 8 are reserved for digital tones and 16 remain spare. Accordingly, a total of 96 channels are provided but at least 16 of the available channels are spares for future expansion.

As indicated above, to provide for control of which terminations are allotted which channels (on a per call basis), the channel memory CH is provided. This channel memory CH has 96 locations and each location stores the address of the termination which has been allocated that channel. The control of the channel memory CH (data update) is performed by the call processor unit (CPU) when connections are established or removed. The channel memory CH, however, also constantly is cyclically read and the associated termination is given a channel transmit and receive pulse as long as its identity is stored in the channel memory CH. These channel transmit and receive pulses actually are a decode of the read out of the channel memory CH, and the pulses are stored for a specified time, external to the channel memory CH. The termination equipment decodes these pulses or data to determine if it corresponds to its identity. If it does, that termination equipment is enabled as long as its identity is stored in the channel memory CH.

Also, in this system, a unique timing problem exists since there is a delay from the time the termination equipment is enabled until the PCM code is available to the time switch or information memory IM (this delay being the time required by the A/D converter to convert the PAM code to PCM). In view of this delay, the channel memory CH must run ahead (read-out) of the time switch information memory IM by that time. Also, the receive pulse must be delayed from when the PCM is available from the time switch information memory IM to when the PAM sample is available from the D/A converter (the conversion time of the D/A converter to convert the PCM to PAM). Since this is fixed, the receive delay also is fixed with respect to the transmit delay (the sum of both). Accordingly, instead of having a second channel memory CH for the receive pulses, the transmit pulse is locally delayed to become that termination equipment's receive pulse.

Figure 3:
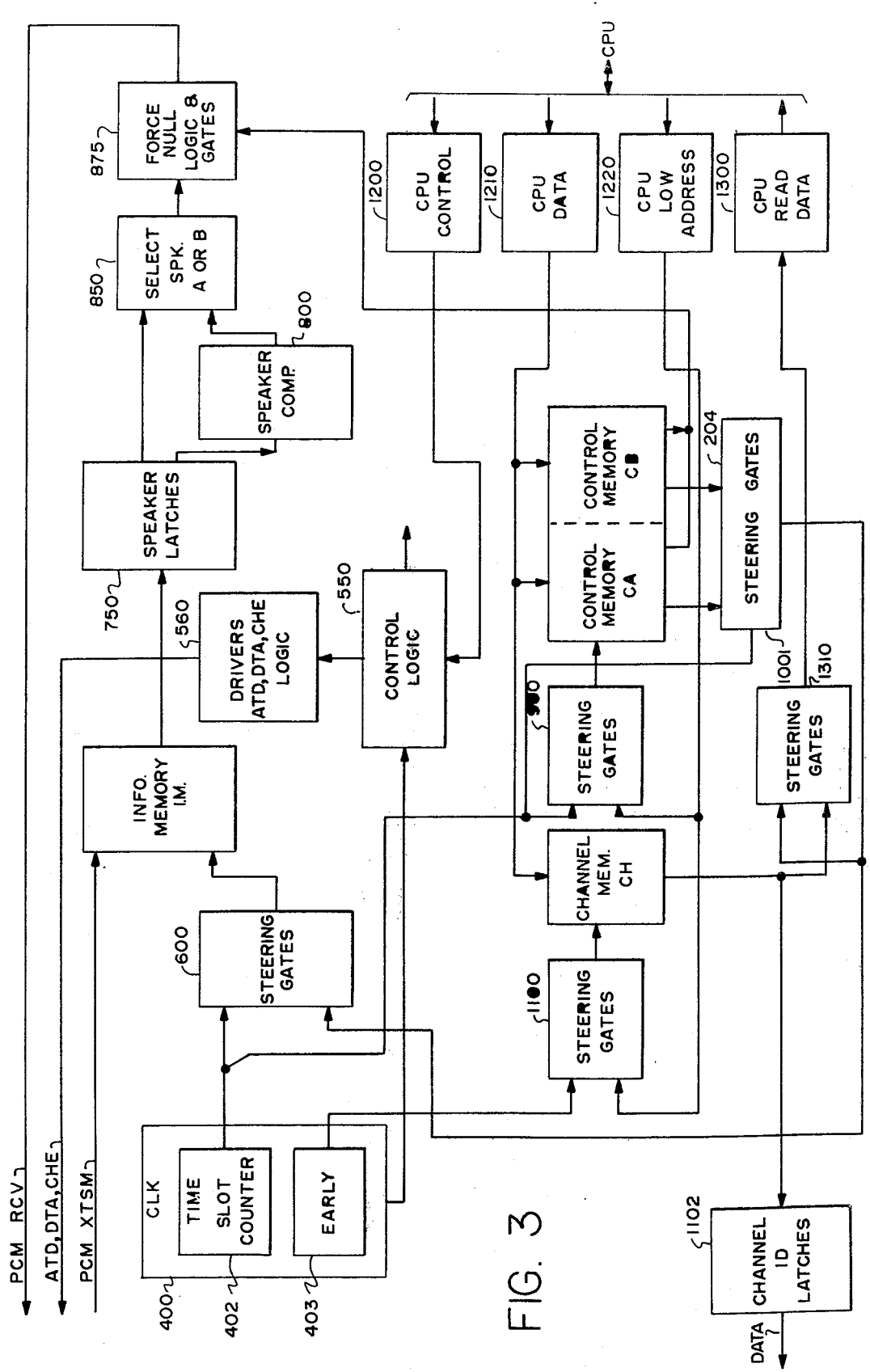

More particularly, the construction and operation of both of the systems of FIGS. 1 and 2 can be better understood by reference to FIG. 3 which is an expanded block diagram of the system of FIG. 2 and to FIGS. 4–15 which illustrate the system of FIGS. 2 and 3 in more substantial detail.

Call Processor Unit (CPU) and Interface (FIGS. 2 & 3)

The call processor unit or CPU is a stored program control for the system and, in the illustrated embodiment, an INTEL 8080 microprocessor is utilized, but other equivalent microprocessors could also be used. A detail description of the construction and operation of the INTEL 8080 microprocessor can be obtained from the instruction manual provided on it, by the INTEL Corporation.

The CPU is the means for setting up and dropping connections and, in this respect, its operation in scanning the terminations, detecting calls for service (seizure), and returning dial tone, etc. is performed in a convention fashion, as disclosed and utilized in existing systems. Once a termination is seized, the setting up and dropping of the connections are accomplished by writing into the control memories CA and CB and the channel memory CH.

The CPU interfaces the network via a CPU control circuit 1200 (FIGS. 3 and 12), a CPU data storage circuit 1210 (FIGS. 3 and 12), a CPU low address circuit 1220 (FIGS. 3 and 12), and a CPU data read back circuit 1300 (FIGS. 3 and 13), for call setup and release using read and write commands. In doing so, the network is treated as three read/write memory modules, each having 96 words with 8 bits per word. These three memory modules are the control memory CA (FIGS. 3 and 10), the control memory CB (FIGS. 3 and 10) and the channel control memory CH (FIGS. 3 and 11). The CPU has no access to the information memory IM (FIGS. 3 and 7), but the operation is slaved to the operation of the information memory IM for normal time switch operation.

More particularly, the CPU interfaces the network in a manner such that the channel memory and the control memories CA and CB appear to the CPU as part of one large 64K memory. This 64K memory formed in part by the channel memory CH and the control memories CA and CB is addressed using 16 bits or $2^{15}$ binary codes. Of this array, the highest and lowest 8 bits are termed the high and low address, respectively. These 8 bits provide 256 or $2^7$, locations which equals ¼K words of eight bits each. The CPU is an 8 bit machine so it can read or write and act upon 8 bit data words. There are also 256 chunks or bytes of ¼K words, which equals 64K words (i.e., 256 times ¼K). This arrangement is provided so that each high address can be used to recognize a ¼K block of words which is the low address.

The CPU accesses the three memories, i.e., the control memories CA and CB and the channel memory CH, by using two ¼K high addresses, with the first memory accessed being the channel memory CH and the second being the control memories CA and CB.

Figure 18:
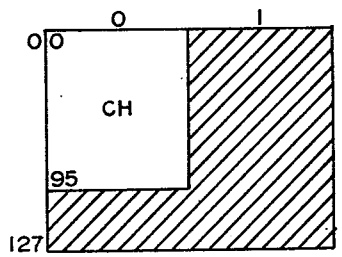
FIGS. 18 and 19 illustrate the manner in which the channel memory and the control memories are viewed as one large memory for accessing, in the system of FIGS. 2 and 3.
Figure 19:
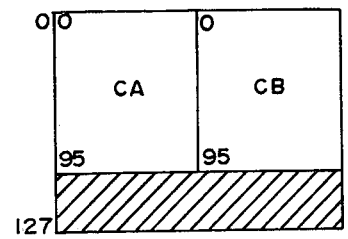
Figure 20:
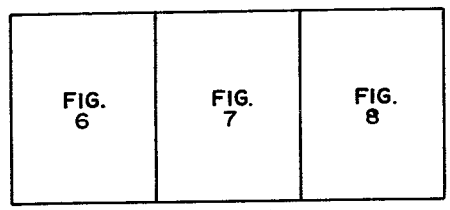
FIGS. 20–22 illustrate how the various indicated figures are assembled.
Figure 21:
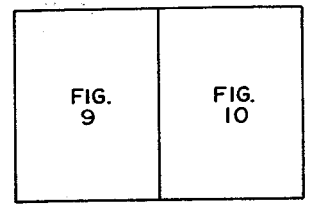
Figure 22:
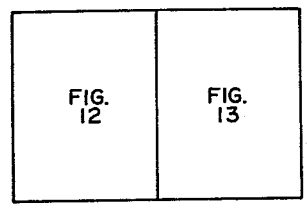

As generally illustrated in FIGS. 18 and 19, the high address of the channel memory CH is 124, or 0111 1100 in binary code. The high address of the control memories CA and CB is 125, or 0111 1101 in binary code. Within the low address of the channel memory CH, only the address locations 0 through 95 are used which, in binary codes, are 0000 0000 through 0101 1111. The control memory CA comprises the address locations 0 through 95 of the 125 high address, while the control memory CB comprises the locations 128 through 223. The switching network responds only to the high addresses 124 or 125 and, if one of these high addresses is detected, it will then determine which of the three memories is to be accessed by looking at the lowest order high address bit and the highest order low address bit. The seven lowest order low address bits then are used to locate one of the 96 possible words (0 through 95) in the accessed memory. The CPU will specify if a read or write operation is required.

The write operation occurs with the CPU first sending out the high address of 124 or 125 and a write request. The switching network looks at the high address to see if it is to be accessed. If it is, and a write is requested, the low address is stored along with the lowest order high address bit. The memory to be written into is known, along with the data or word to be written into that memory. The CPU then sends the data which the switching network also stores, but in a temporary buffer. The CPU now has completed its operation.

During the last quarter of the next time slot, the data is transferred from the temporary buffer to the memory location in the memory previously requested by the CPU. This latter information also is saved in a temporary buffer, until utilized. The switching network now is ready for another CPU operation.

The read operation also begins with the CPU first sending out the high address of 124 or 125, but with a read request. Since the switching network has been addressed and it is a read operation, the wait state of the CPU is forced by the switching network dropping the CPU's ready line low.

The CPU is forced to its wait state since it will expect to read in the data in 500 $\mu$sec but the switching network has not "fetched" the data yet since the time slot is 1.3 $\mu$sec. long and it must wait until the last quarter of the next time slot. The address needed is again stored as in the write operation, and during the last quarter of the next time slot, the data is read from the addressed location of the proper memory into a temporary "read back" buffer. The CPU's ready line is now put high and the data sent out to the CPU. The CPU leaves the wait state and reads in the data. The switching network is ready to be accessed again after the CPU removes its high address.

It may be noted that the CPU is slowed down only during a read operation. This read operation is not needed, except to verify CPU write operations. Also, the switching network "time switching" operation is never interrupted since the CPU is allowed to access the memories only during the last quarter of every time slot.

Figure 12:
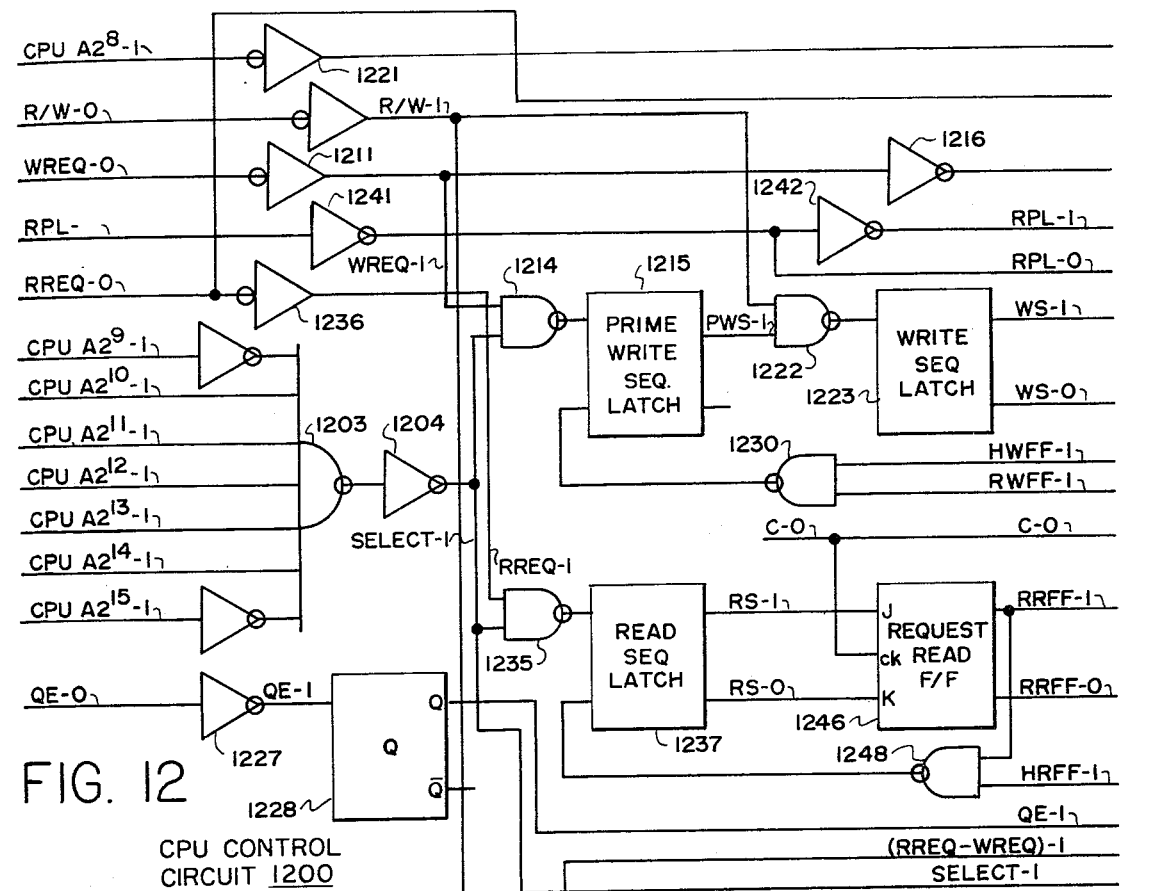
FIGS. 12 and 13, when assembled as shown in FIG. 22, illustrate the CPU control circuit, the CPU low address circuit, the CPU data storage circuit, and CPU data read back circuit, of the system of FIGS. 2 and 3.
Figure 12:
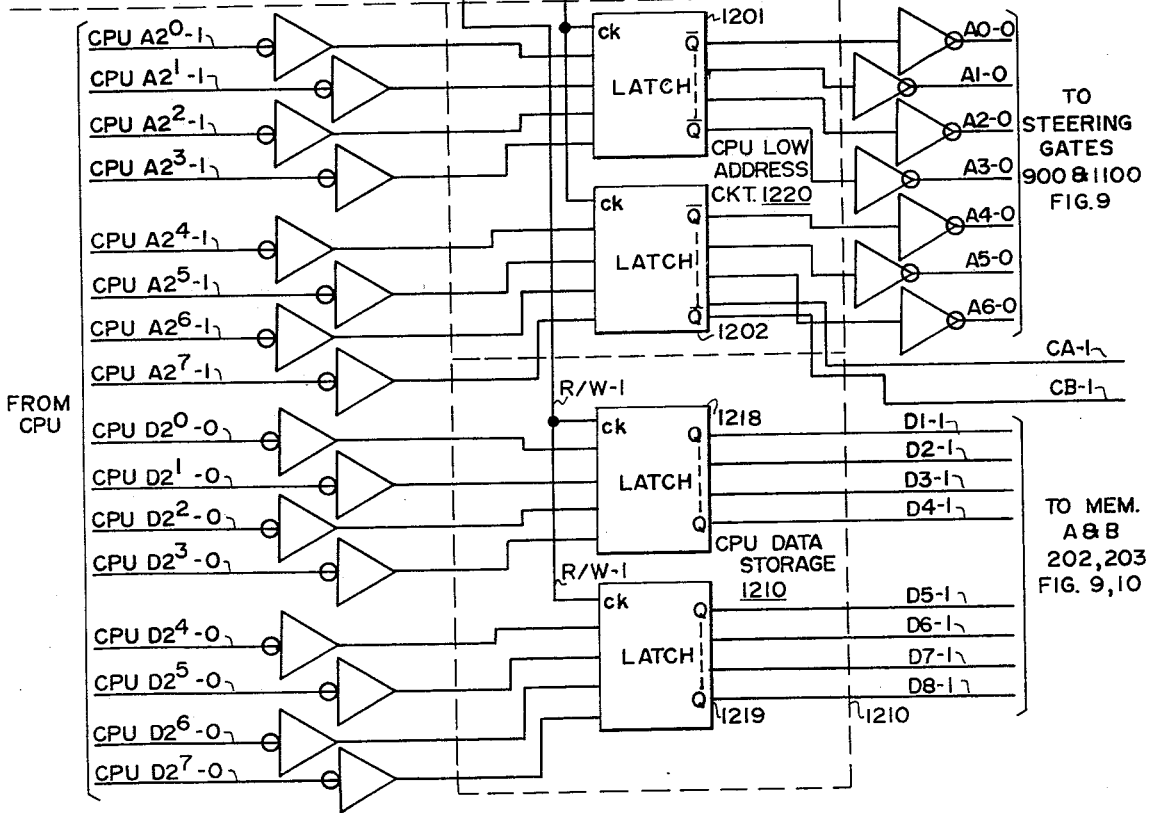
Figure 13:
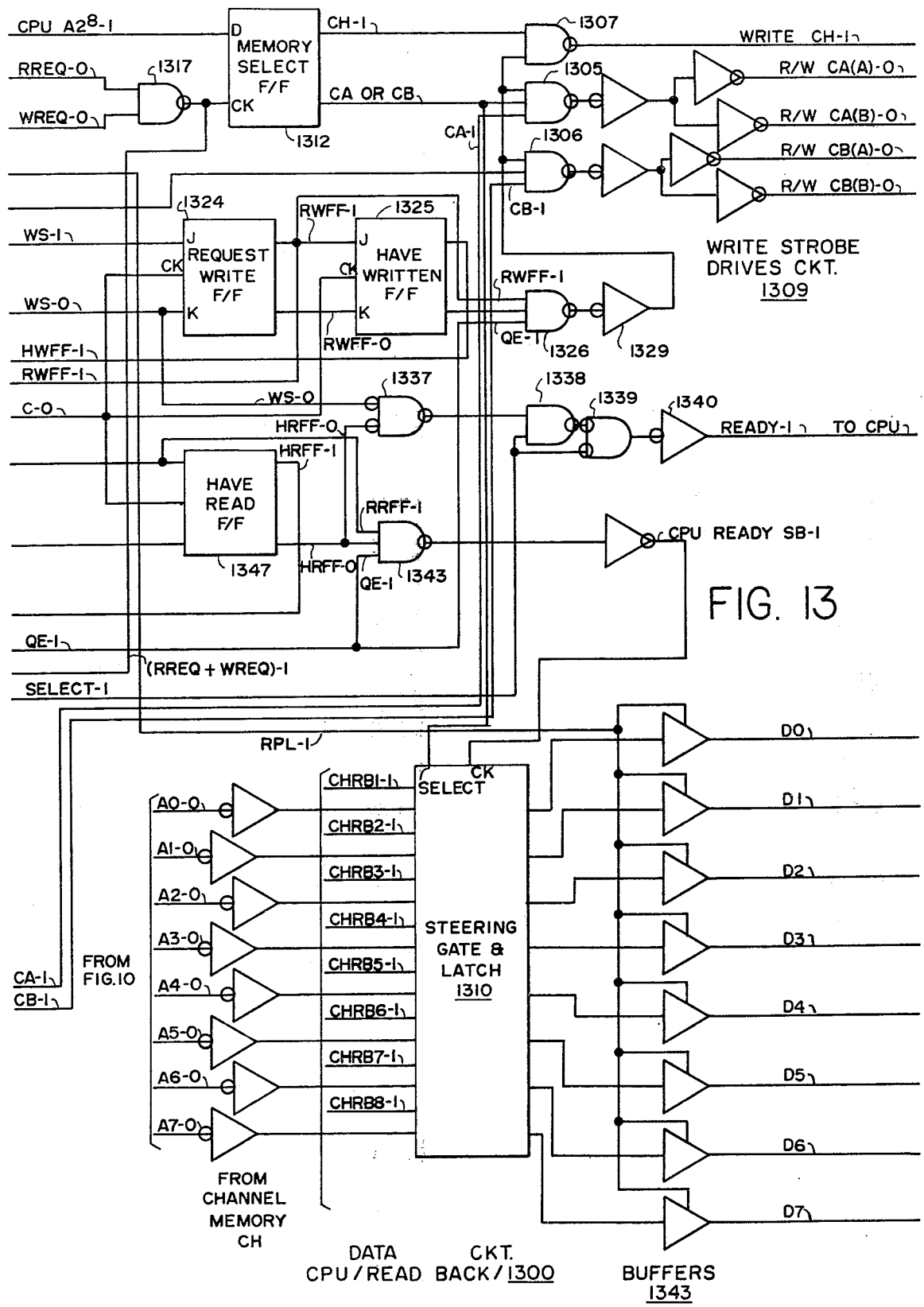

With reference to FIGS. 12 and 13, the abovedescribed method of selecting one of the three memories CH, CA and CB and one of the 96 words or locations in the selected one of the memories can be seen. The address binary bits from the CPU are coupled to the CPU low address circuit 1220 and to the CPU control circuit 1200. The address binary bits $CPUA2^0$ through $CPUA2^7$ are coupled to the CPU low address circuit 1220, the address binary bit $CPUA2^8$ is coupled to a memory select flip-flop 1312 (FIG. 13) and the address binary bits $CPUA2^9$ through $CPUA2^{15}$ are coupled to a type 7430 positive NAND gate 1203. The CPU low address circuit 1220 can be formed of two type 74175 latches 1201 and 1202, while the memory select flip-flop 1312 can be a type 7474 flip-flop.

The lowest order high address bit $CPUA2^8$ will operate the memory select flip-flop 1312, upon the occurrence of a READ or WRITE REQUEST (RREQ or WREQ) signal, to select the channel memory CH or the two control memories CH and CB, via the signals CH-1 or (CA + CB)-1 at its output. The highest order low address bit $CPUA2^7$ coupled to the latch 1202 operates the latter to select either the control memory CA or CB, via the signals CA-1 or CB-1 at its output. The other seven lower address bits $CPUA2^0$ through $CPUA2^6$ coupled to the latches 1201 and 1202 of the CPU low address circuit 1220 define the address location of the one word of the 96 words to be selected within the accessed memory. The other seven high address bits $CPUA2^9$ through $CPUA2^{15}$ enable the gate 1203 to provide an output signal which after being inverted by the inverter 1204 corresponds to the signal SELECT-1.

The signal CH-1 from the memory select flip-flop 1312 is coupled to the NAND gate 1307 forming a part of the write strobe drivers circuit 1309, while the signal (CA + CB)-1 from the memory select flip-flop 1312 is coupled to the NAND gates 1305 and 1306 of the write strobe drivers circuit 1309. The signals CA-1 and CB-1 from the latch 1202 of the CPU low address circuit 1220 are coupled to the gates 1305 and 1306, respectively. The appropriate one of these gates 1305, 1306 and 1307 is enabled by these signals, upon the occurrence of the signal CPU WRITE SB-1 described more fully below, to select or access the desired memory. The address bits are gated or clocked into the memory select flip-flop 1312 and the latches 1201 and 1202 of the CPU low address circuit by either the signal RREQ or WREQ (READ REQUEST or WRITE REQUEST) from the CPU, as more fully described below.

During a write operation, the CPU first sends the high address of 124 or 125, and a write request (WREQ-O) to the network. The switching network looks at the high address to see if it is to be accessed, as described above. If it is, and a write is requested, the low address is stored along with the lowest order high address bit, again as described above. The CPU then sends the data (the $CPUD2^0$ through $CPUD2^7$ signals) which is coupled to and stored in the CPU data storage circuit 1210 which is a temporary buffer formed of type 74175 latches.

The write request, the signal WREQ-O, from the CPU is coupled through an inverter 1211, and the latter's output is coupled to a NAND gate 1214, along with the SELECT-1 signal from the NAND gate 1204. Upon the coincident receipt of these two signals, the NAND gate 1214 is enabled and operates or sets a prime write sequence latch 1215 to initiate the write operation. The write request (WREQ-1) also is coupled through another inverter 1216 to a NOR gate 1317 which is enabled to output the signal (RREQ + WREQ)-1. This signal is coupled to the memory select flip-flop 1312 and the latches 1201 and 1202 to clock the address information into them, as described above.

The CPU, during its normal sequence of operation, now forwards the CPU data (CPU D2⁰ - CPU D2⁷) and this data is coupled to the latches 1218 and 1219 of the CPU data storage circuit 1210. A write strobe signal R/W-O also is forwarded by the CPU and this write strobe is coupled through an inverter 1221 to the latches 1218 and 1219 to clock the data into them. This R/W-1 strobe also is coupled to the NAND gate 1222. The signals R/W-1 and PWS-1 enable this NAND gate 1222 to set the write sequence latch 1223 which then outputs a WS-1 signal. This WS-1 signal sets a request write flip-flop 1324.

The CPU is now finished and goes on with other tasks since the network has all the information to update the known memory location. The memory is updated during the last quarter of the next time slot, upon the occurrence of the QE-O signal. This single write pulse is selected by the condition of RWFF·HRFF·QE-1 in gate 1326.

More particularly, the WS-1 signal from the write sequence latch 1223 is coupled to and sets a request write flip-flop 1324 which outputs a signal RWFF-1 to a have written flip-flop 1325 and a NAND gate 1326. When the timing signal QE-O occurs, it is coupled through an inverter 1227 to a monostable 1228 which may be a type 74121 monostable, to fire it. The output QE-1 from the monostable 1228 is coupled to the NAND gate 1326. When C-O occurs, the have request write flip-flop 1324 is clocked. Since the request write flip-flop 1324 is a 7476 type master slave flip-flop, the output is not seen until C-O is gone, and the signal RWFF-1 to the NAND gate 1326 becomes true. The NAND gate 1326 now is enabled, since HRFF-O is true because it has not yet set and its output is coupled through an inverter 1329 and constitutes a write strobe pulse CPU WRITE SB-1 which is coupled to the NAND gates 1305, 1306 and 1307 to enable the appropriate one of them. The outputs of these gates 1305-1307 are coupled to the control memories CA and CB and the channel memory CH to clock the data into the appropriate one of them and into the proper address location.

Only one write strobe pulse CPU WRITE SB-1 is generated since HWFF will set on the following occurrence and removal of C-O and disable gate 1326. The HWFF-1 output of the have written flip-flop 1325, and the RWFF-1 output of the request write flip-flop 1324 are coupled to the NAND gate 1230. When both are true, the NAND gate 1230 is enabled to reset the prime write sequence latch 1215 which, in turn, then resets or clears the other latches and flip-flops 1223, 1324 and 1325.

A read operation also begins with an address being coupled to the CPU control circuit 1200 and the CPU low address storage circuit 1220, as described above, followed by a READ REQUEST (RREQ-O). This RREQ-O signal is coupled through inverter 1236 to the NAND gate 1235, and to the NOR gate 1317. The NAND gate 1235 is enabled and sets a read sequence latch 1237 to initiate the read operation. The CPU also is put in the "wait" state by dropping the READY signal to the CPU low, via the gates 1337-1339 and the inverter 1340.

The CPU, in its normal sequence of operation, outputs a read place level (RPL) signal just after it outputs the read request RREQ-1 signal, regardless of the state of the READY signal, to gate the data into the CPU. This RPL-1 signal is through a pair of inverters 1241 and 1242 to the CPU data read back circuit 1300 to gate the buffers 1343. These buffers may be, for example, type 74126 buffer gates. However, since the data has not yet been "fetched", the CPU must be stopped on the read operation, by dropping the READY signal to the CPU low, as described above.

During the next QE-O signal, the monostable 1228 is again set so that its output QE-1 to the NAND gate 1343 is true. During the next C-O signal, the request read flip-flop 1246 is clocked, and its output RRFF-1 becomes true and is coupled to the have read flip-flop 1347. This RRFF-1 signal also is coupled to the NAND gate 1343. This gate now is enabled, and generates one read strobe pulse CPU READY SB-1 to the steering gate and latch circuit 1310 which may be two type 74298's. This pulse clocks the circuit 1310 to gate the data from the accessed memory to the buffers 1343 of the CPU data read back circuit 1300. The steering gate 1001 and the steering gate and latch circuit 1310 control what memory data gets to the buffers 1343, and are, in turn, controlled by the memory identity bits. The data is gated from the buffers 1343 to the CPU, since the signal RPL-1 is true. The have read flip-flop 1347 also is clocked by the C-O signal, and its output HRFF-1 will become true once C-O is gone. This signal is coupled to the NAND gate 1248 and, since both of its inputs now are true, it is enabled to reset the read sequence latch 1237 to end the read sequence. The HRFF-O signal from the have read flip-flop 1347 allows the READY signal to the CPU to rise to permit the CPU to accept the data. The CPU then removes the RPL-1 signal and the address, and its operation is done.

Figure 4:
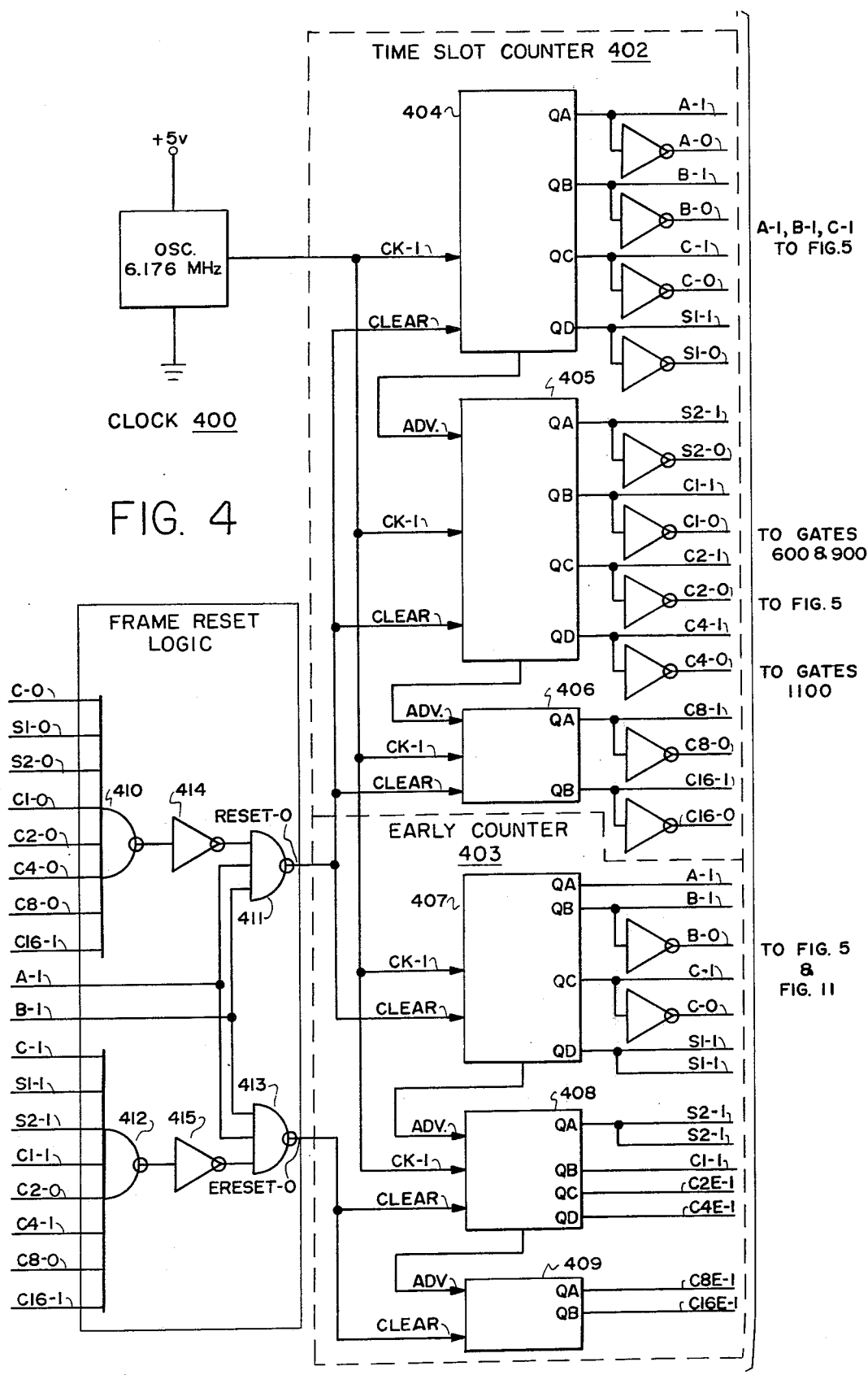
FIG. 4 illustrates the clock used in the system of FIGS. 2 and 3.
Figure 5:
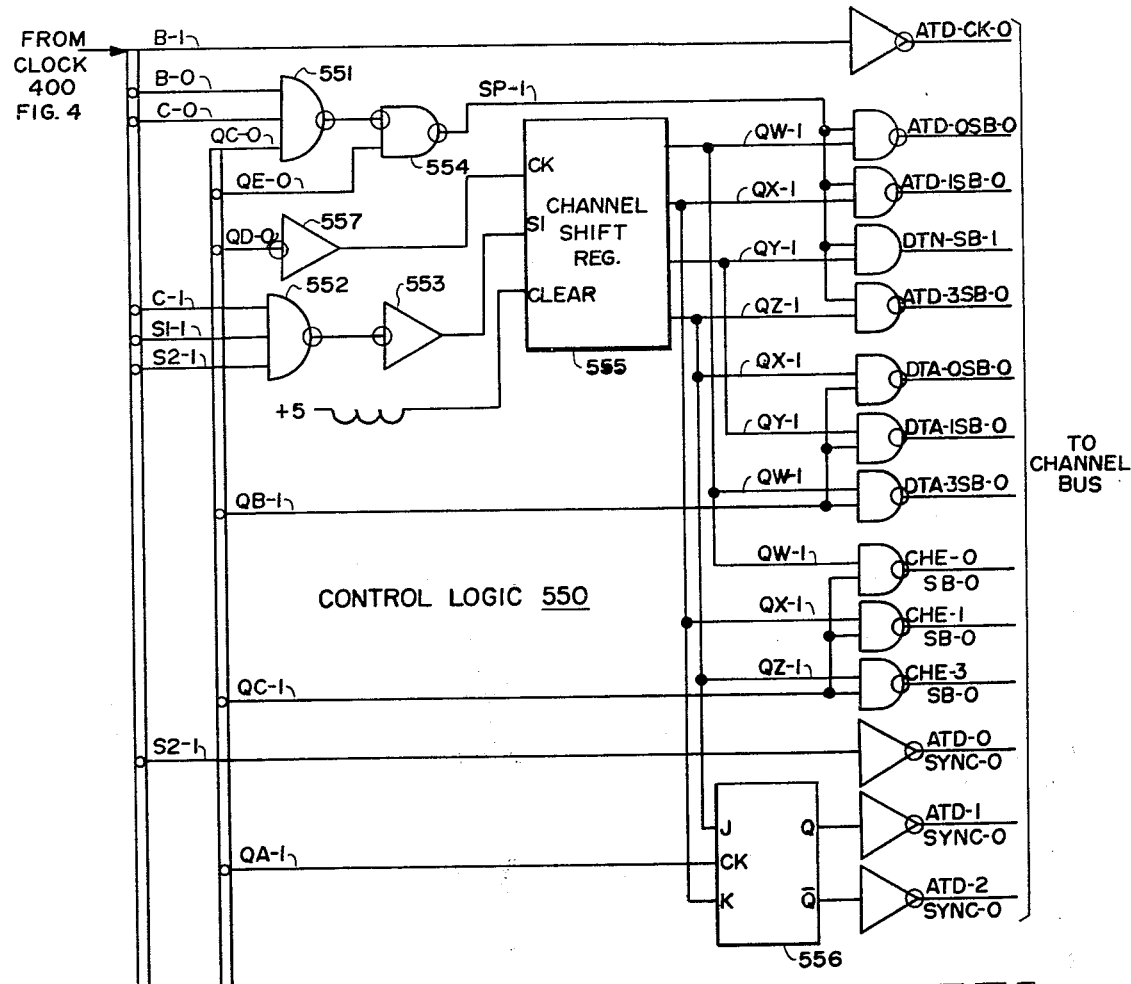
FIG. 5 illustrates the control logic and the strobe pulse generator of the system of FIGS. 2 and 3.
Figure 5:
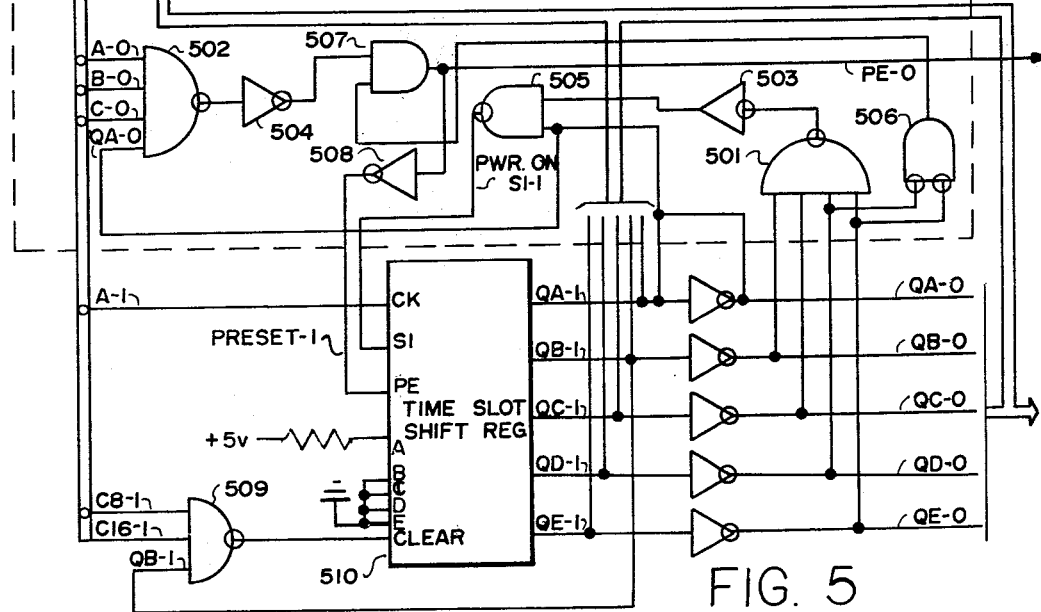

Clock 400 (FIG. 4).

The clock 400 is a 6.176 MHz oscillator which provides the basic timing to the network and PCM peripherals. The output of the clock 400 is a square wave output clock pulse train of 162 microsecond period and 50% duty cycle to give an 81 microsecond on pulse and an 81 microsecond off pulse. This clock pulse train (CK-1) drives a time slot counter 402 formed of the synchronous counters 404–406 and an early counter 403 formed of the synchronous counters 407–409. The synchronous counter 404–409 may be, for example, type 74163 four bit counters, or their equivalents, connected to successively divide by two the basic clock frequency to provide a series of pulse trains. The time slot counter 402 provides the pulse trains A, B, C, S1, S2, C1, C2, C4, C8 and C16, and the early counter 403 provides the pulse trains A, B, C, S1, S2, C1, C2E, C4E, C8E and C16E. These pulse trains from the early counter 403 occur eight time slots earlier than the pulse trains from the time slot counter 402, for reasons set forth more specifically below.

Figure 16A:
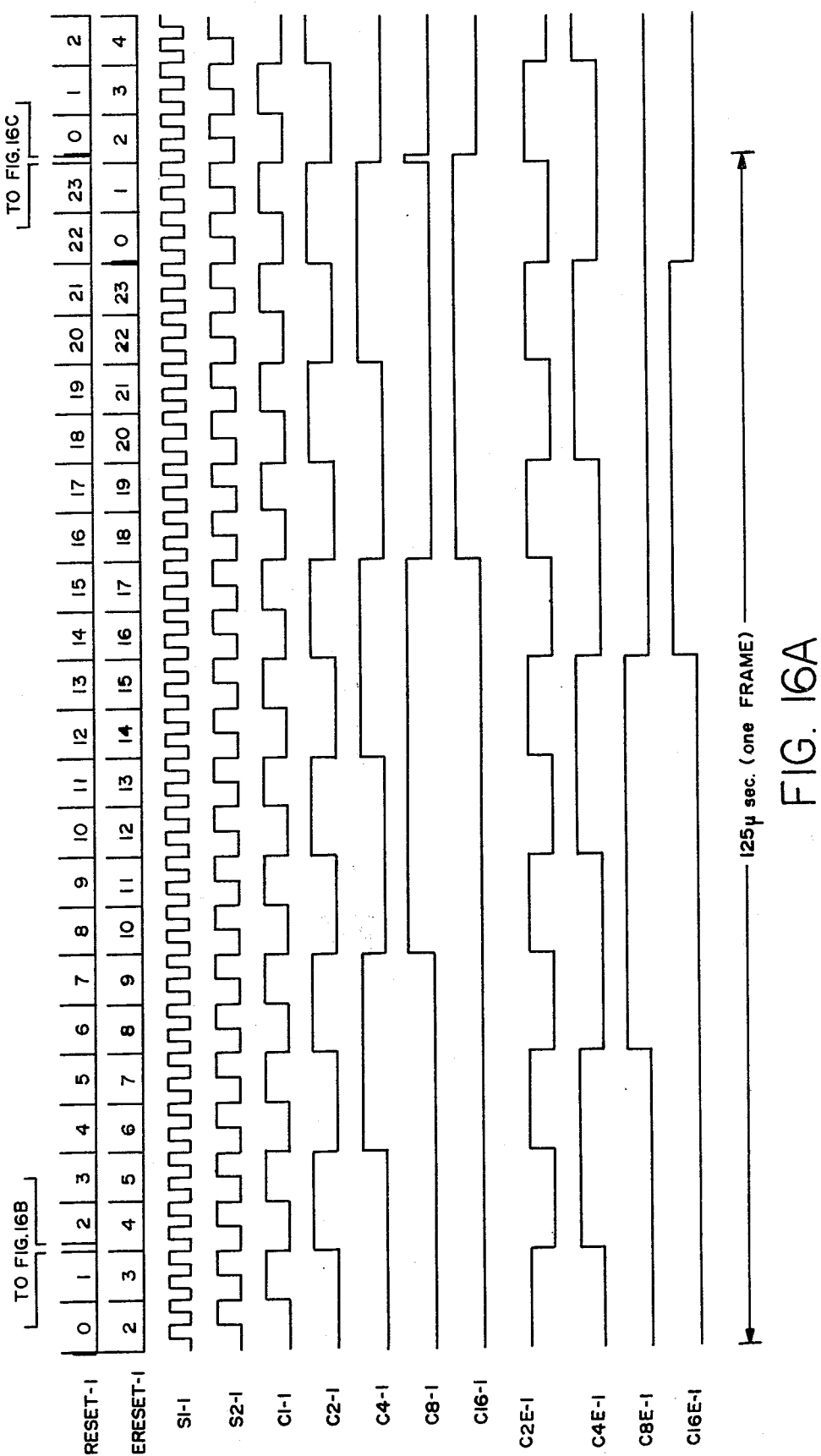
FIGS. 16A, 16B, 16C and 17 are pulse timing charges illustrating various clock and timing pulses of the system of FIGS. 2 and 3.
Figure 16B:
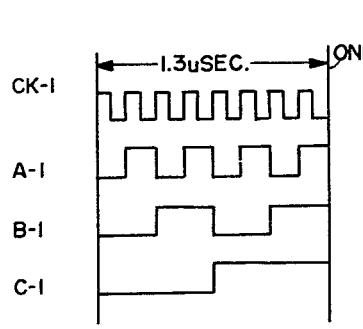
Figure 16C:
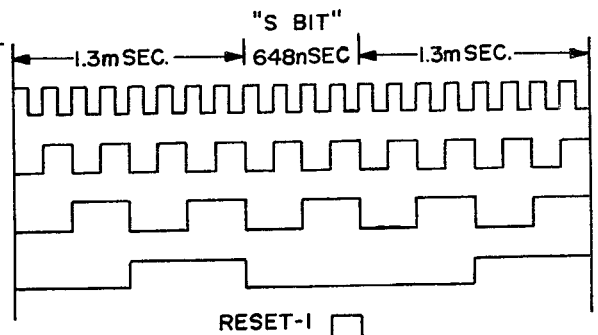

As illustrated in FIG. 16, the A, B and C pulses divide a time slot which is 1.3 microseconds long into 8 divisions so that the "time switching" operation may be performed. The S1 and S2 pulses divide a channel which is 5.2 microseconds long into four divisions which correspond to the group 0, 1, 2 and 3 sub-divisions of every channel. The S1 pulse is on for 1.3 microseconds and off for 1.3 microseconds. The C1, C2, C4 and C8 and C16 pulses divide a frame which is 125 microseconds long into 24 channels of 5.2 microseconds each, and one short channel of 648 microseconds. The S1 and S2 pulses are off during this shortened channel and result in one-half of a time slot. The C pulse never rises during this time slot. The counters 404–409 are synchronous and clock on the rise of the clock or oscillator input, and have a look ahead carry and synchronous clear so that all output edges occur together rather than with a ripple through operation. Decodes are strobed since rise-fall race conditions can occur. The counters 404–407 are reset by decoding the count:

$$C16 \cdot C8 \cdot \overline{C4} \cdot \overline{C2} \cdot \overline{C1} \cdot \overline{S2} \cdot \overline{S1} \cdot \overline{C} \cdot B \cdot A$$

by means of the NAND gates 410 and 411 and the inverter 414 which provide the RESET-O pulse. This count corresponds to the end of the first half of time slot 96 or the end of the first eighth of channel 24.

The time slots are numbered zero through 96, and the channels are numbered zero through 24. As a result, time slot 96 is 648 microseconds long instead of the normal time slot of 1.3 microseconds, and corresponds to the synchronization bit (S bit) common to D2 format PCM codes. The D2 format requires 193 pulses of 648 microseconds every frame.

The T1 or digital trunk option provided requires timing and the S bit (time slot 96) is more or less skipped over by the time switch operation.

A second reset is decoded to allow the early counter 403 to run eight time slots ahead of the time slot counter 402. This is for the purpose of adjusting the PCM peripherals timing to the two channel delay necessary to "sample and hold" in the A/D convertors. This second reset is a decode of:

$$C16 \cdot \overline{C8} \cdot C4 \cdot \overline{C2} \cdot C1 \cdot S2 \cdot S1 \cdot C \cdot B \cdot A$$

by means of the NAND gates 412 and 413 and the inverter 415 which provide the ERESET-O pulse. This count corresponds to the end of channel 21. Both reset pulses occur on the rise of the A pulse.

The series of pulse trains provided by the time slot counter 402 and the early counter 403 are of the same type and duration, however, as indicated above, the pulse trains from the early counter 403 occur eight time slots ahead of the corresponding pulse trains from the time slot counter 402. These pulse trains are distributed throughout the network, as more particularly described below.

In particular, the A, B and C pulses from the time slot counter 402 are coupled to a strobe pulse generator 500 (FIG. 5) which includes a time slot shift register 510 used to create strobe pulses during four times of each time slot. This allows for steering of addresses using the B and C pulse decodes and strobing on the rising edges of each A pulse. The shift register 510 which may be a type 7496 5-bit shift register provides clean pulses whereas decoding the A, B and C pulses would not. It also includes power on logic to synchronize the shift register to the time slot beginning.

More particularly still, the A-O, B-O and C-O pulses are coupled to the NAND gate 502, along with the strobe pulse QA-O. The strobe pulses QB-O, QC-O, QD-O and QE-O all are coupled from the output of the time slot shift register 510 to a NAND gate 501. The output of the NAND gate 501 is coupled through an inverter 503 to an AND gate 505. The other input to the AND gate 505 is the strobe pulse QA-O. When the AND gate 505 is enabled, its output which is a power on signal PWR ON SI-1 is coupled to the serial input of the register 510. The QD-O and the QE-O strobe pulses are coupled to a NAND gate 506, and the latter's output is coupled to a NAND gate 507. The other input to the NAND 507 is the output of the NAND gate 502 which is coupled through an inverter 504. When NAND gate 507 is enabled, its output is coupled through an inverter 508 to the common preset input of the register 510. The A-1 pulse is coupled to the clock input of the register 510, and the C8-1, C16-1 and the QB-1 are coupled to its clear input by way of gate 509.

Figure 17:
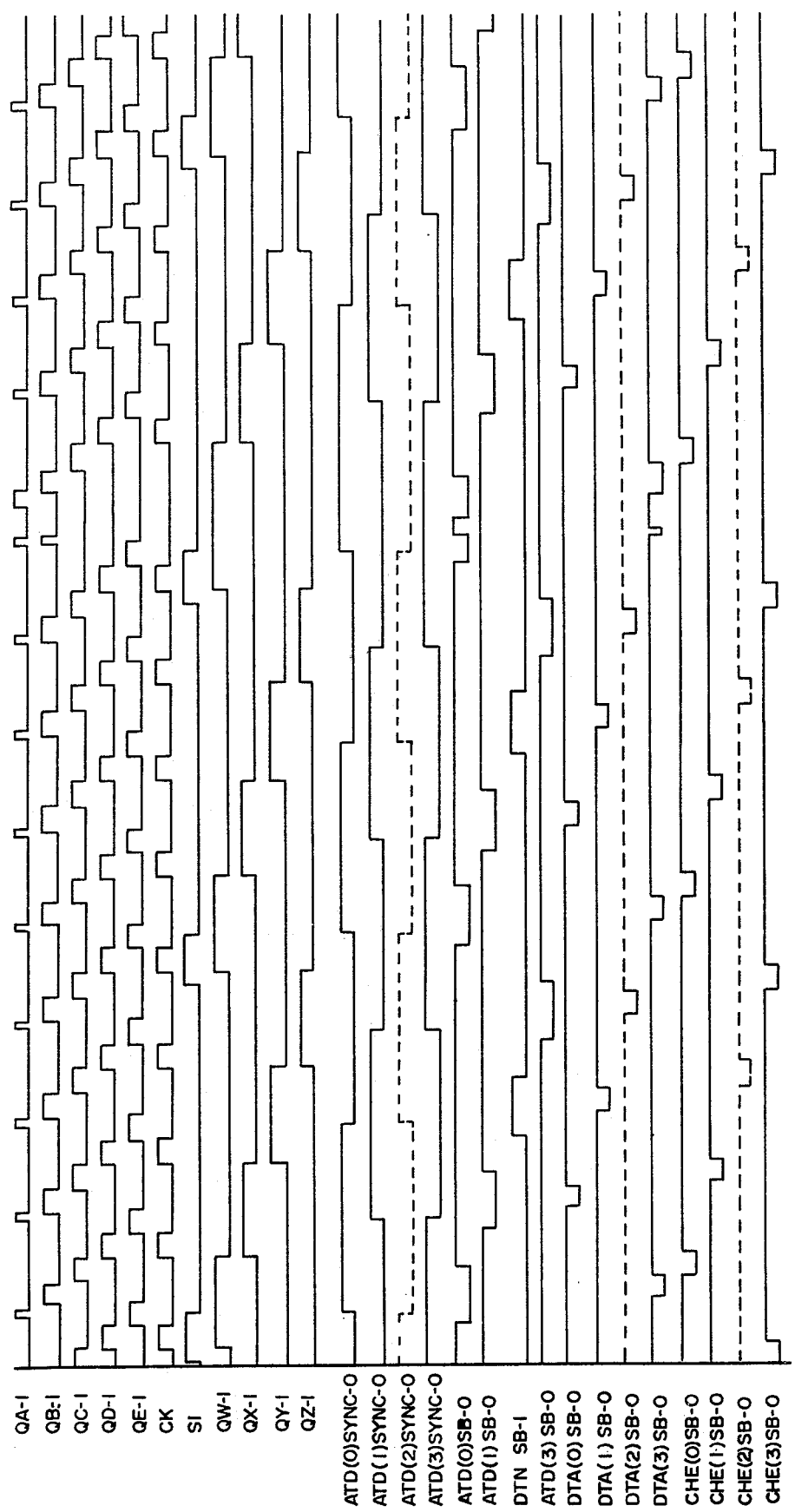

In this fashion, the strobe pulses QA, QB, QC, QD and QE are provided at the output of the time slot shift register 510. The QA pulse is short but all of the others are 32 microseconds long, as can be seen in FIG. 17. The QE pulse includes the QA pulse, and also extends into two time slots. The S bit results in no QC, QD or QE pulse, a shortened QB pulse and a long QA pulse at its end. This is because the time slot 96 and the QB pulses are used to reset the shift register. This also results in the PWR ON SI-1 signal coming on since all outputs are off. On the next A pulse rise, the QA pulse occurs and suppresses the normal preset enable for time slot 0. This is also the only QA pulse which does not occur with a QE pulse. All other preset enables synchronize QA to the beginning of each time slot.

The QA through QE strobe pulses from the time slot shift register 510 are coupled to the control logic circuit 550. These strobe pulses in conjunction with the B, C, S1 and S2 signals from the early counter 403 are utilized to drive a channel shift register 555 and the ATD, DTA, CHE and ATD SYNC drivers 560. The channel shift register 555 which may be a type 7496 5-bit shift register provides output pulses QW-1, QX-1, QY-1 and QZ-1 that divide a channel into four divisions and are used to multiplex and demultiplex the PCM buses and the outputs of the channel memory CH into the four groups of 24 channels each. The latter is done by the logic which creates the drivers 560, as illustrated. The overall operation is to write PCM code into the information memory IM during the first quarter of a time slot and to read out PCM code during the second and third quarters of a time slot corresponding to the control memory CA and CB addresses, respectively, and finally to compare these codes and to output the least larger of the two codes which is actually the largest PAM sample. The information memory IM therefore undergoes a write and two read operations every time slot, all as more fully described below.

More particularly, the B-O and C-O from the early counter 403 and the QC-O from the time slot shift register 510 are coupled to a type 7410 NAND gate 551. The output of NAND gate 551 is coupled to a type 7400 NAND gate 554, as is the QE-O pulse from the shift register 510. The C-1, S1-1 and S2-1 outputs of the early counter 403 are coupled to a type 7410 NAND gate 552, and the latter's output is coupled through an inverter 553 to the serial input of the channel shift register 555. The QD-O pulse is coupled through an inverter 557 to the clock input of the channel shift register 555. The channel shift pulses QZ-1 and QX-1 are coupled to the J and K inputs of a type 7476 flip-flop 556, which the QA-1 pulse is coupled to its clock input. As indicated above, these outputs drive the logic which creates the drivers 560, to multiplex and demultiplex the PCM buses and the outputs of the channel memory CH into the four groups of 24 channels each, in accordance with the following logic equations:

| | |
|---|---|
| ATD(0)SYNC = S2 | FF(SET) = QA(rising edge). QZ |
| ATD(1)SYNC = FF | FF(RESET) = QA(rising edge). QX |
| ATD(2)SYNC = $\overline{FF}$ | |
| ATD(CK) = B | |
| ATD(0)SB = QW.SP | |
| ATD(1)SB = QX.SP | SP = $\overline{B}.\overline{C}.\overline{QC}$ + QE |
| DTN SB = QY.SP | |
| ATD(3)SB = QZ.SP | |
| DTA(0)SB = QX.QB | |
| DTA(1)SB = QY.QB | |
| DTA(3)SB = QW.QB | |
| CHE(0)SB = QW.QC | |
| CHE(1)SB = QX.QC | |
| CHE(3)SB = QZ.QC | |

As can be seen in FIG. 3, the output pulse trains from the clock 400, in addition to being coupled to the control logic 550 as described above, also are coupled to the steering gate 600 which controls the entry of information into the information memory IM, the steering gate 900 which controls the entry of information into the control memory CA and CB, the steering gate 1001 which controls the entry of information to the steering gates 1310 and 600, and the steering gate 1100 which controls the entry of information into the channel memory CH.

Figure 6:
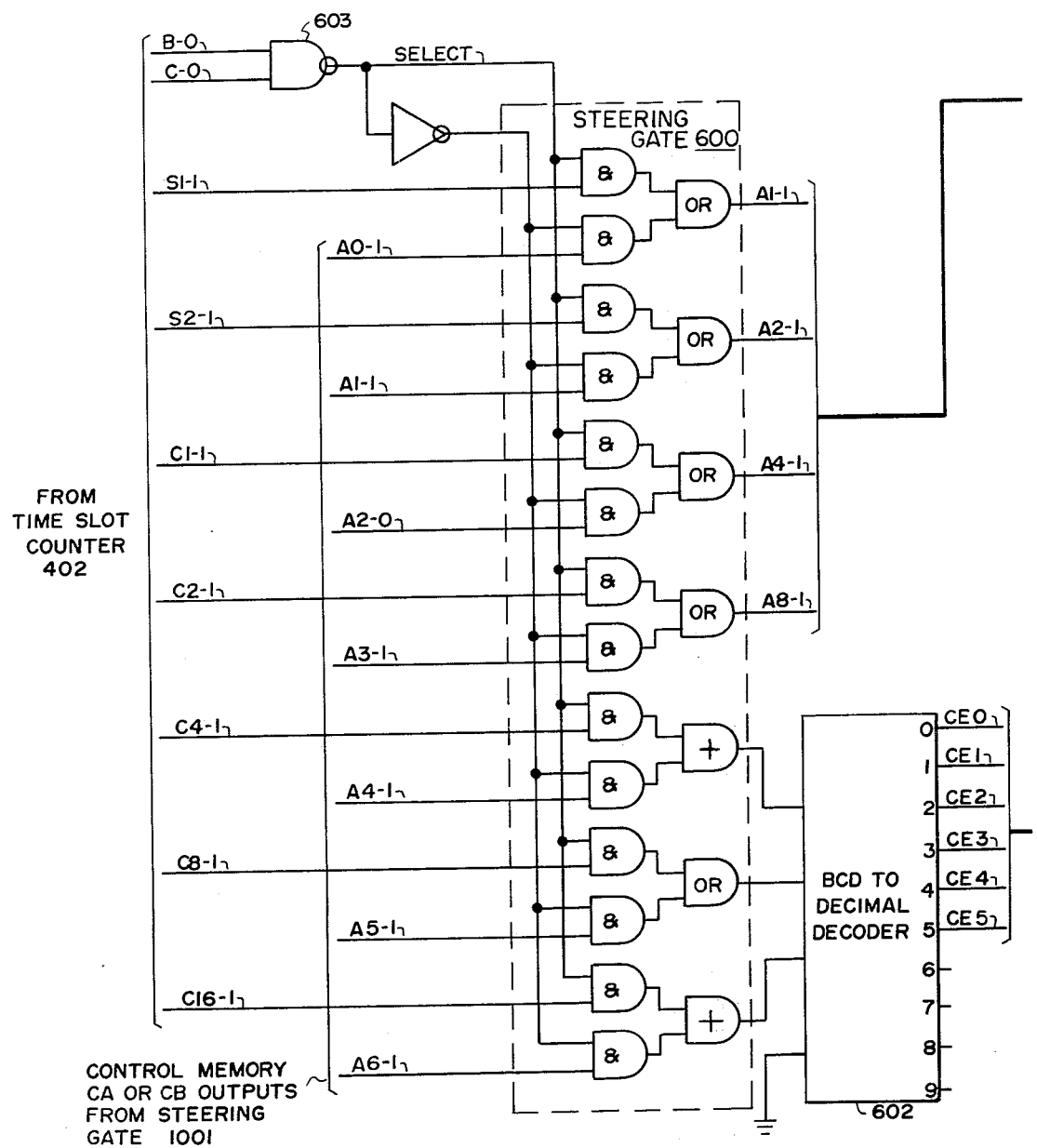
FIGS. 6, 7 and 8, when assembled as illustrated in FIG. 20, illustrate the information memory, the steering gate for accessing it, the speaker latches at its output, the comparator and the force null logic for receiving and sending PCM to the peripheral equipment, of the system of FIGS. 2 and 3.
Figure 6:
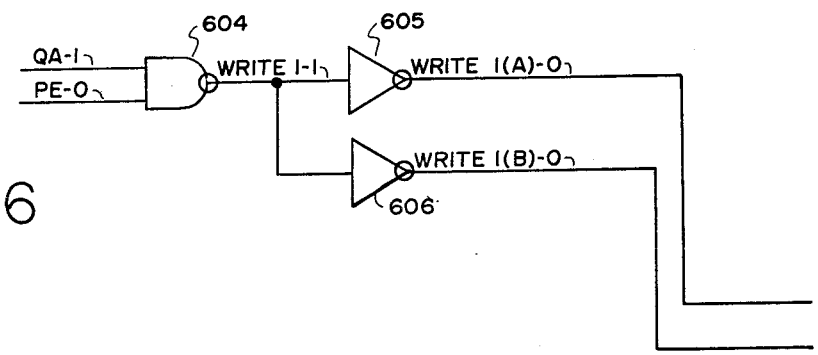

Steering Gate 600 (FIG. 6)

As indicated above, the outputs S1, S2, C1, C2, C4, C8 and C16 of the time slot counter 402 are coupled to the steering gates 600. In addition to these inputs to the steering gate 600, the outputs AO-A6 from the steering gate 1001 associated with the control memories CA and CB also are coupled to it. The steering gate 600 may be formed of type 74157 quadruple 2-input data selector/multiplexers connected and operated to select either the inputs from the time slot counter 402 or the inputs from the steering gate 1001 for coupling to the information memory IM.

By selecting the inputs from the time slot counter 402, which effectively define an address location in the information memory IM corresponding to a particular time slot, the PCM data received during that time slot can be written into the information memory IM. Correspondingly, if the inputs from the steering gate 1001 are selected, the data stored in the information memory IM at the location addressed can be read out, as more fully described below.

It may be noted that the inputs S1, S2, C1 and C2 and the inputs AO, A1, A2 and A3, when selected, provide an output which defines an address location within the information memory IM. The inputs C4, C8 and C16 and the inputs A4, A5 and A6, when selected, provide an output which is coupled to a BCD to decimal decoder 602 which may be, for example, a type 7442 decoder, to select two of the 12 type 7489 read/write memories which make up the information memory IM, as more fully described below. In other words, two of the 12 memories are selected and data is written into or read out of those memories at the indicated address location.

As indicated above, the time slot operation is divided into four divisions by the B and C pulse decodes. The overall operation is to write PCM code into the information memory IM during the first quarter of a time slot, and to read out PCM code during the second and third quarters of the time slot, corresponding to the control memory CA and CB addresses, respectively. Accordingly, gating of this information, either PCM codes or addresses from the control memories CA and CB is controlled by the B-O and C-O pulses coupled to the NAND gate 603. The output of the NAND gate 603 enables the select input of the gates comprising the steering gate 600, to gate this information into the information memory IM.

Figure 7:
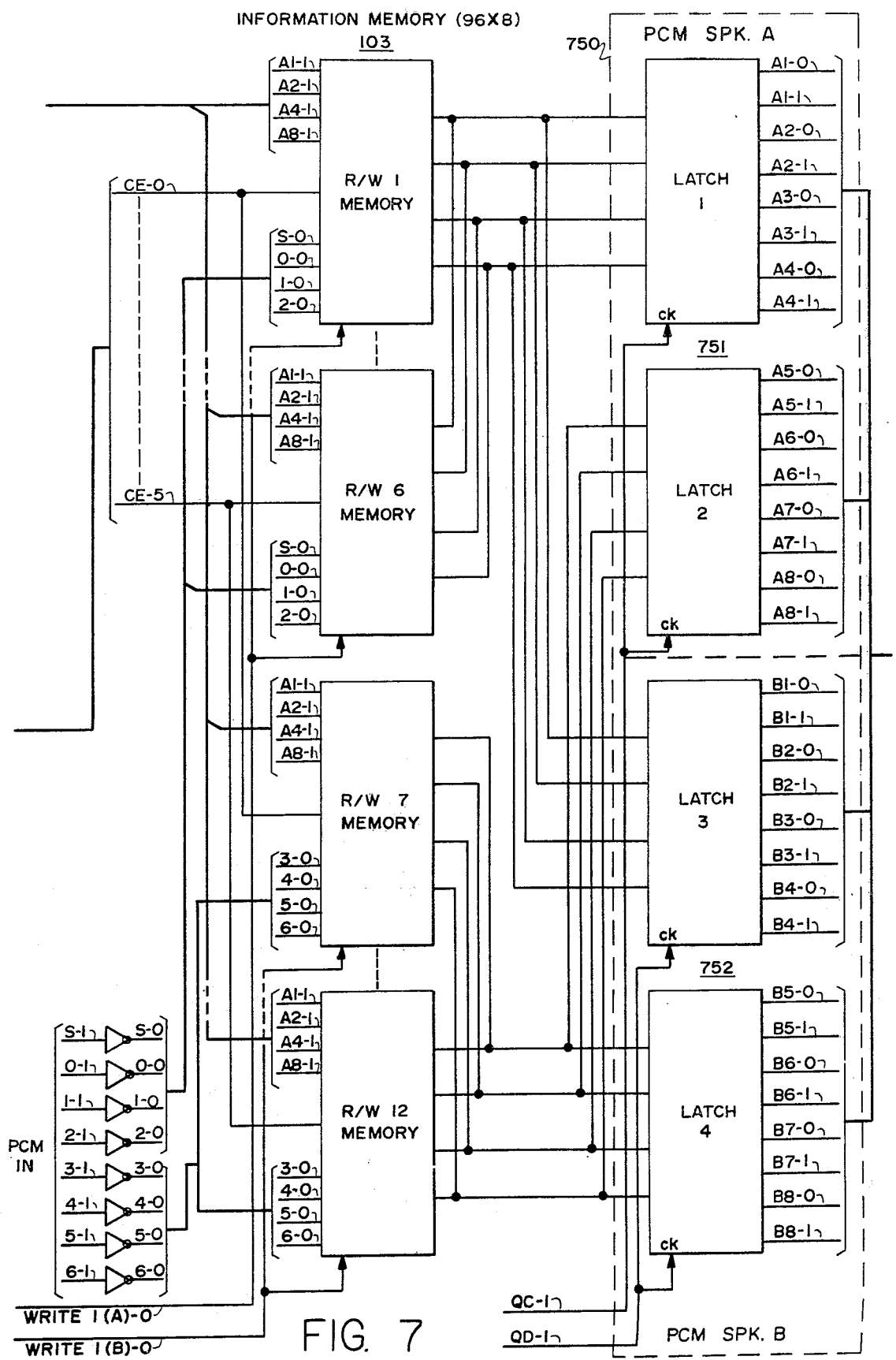

Information Memory IM (FIG. 7)

The information memory IM, as can be seen in FIG. 7, is a 96 word memory of 8 bit words, and stores the PCM samples of each of the 96 time slots. In the illustrated embodiment, it is formed of 12 type 7489 read/write memories connected so as to form one 96 × 8 memory. The information memory IM is written into or read out by selecting two of the 12 read/write memories and by then addressing a location within that selected memory pair. The selection and addressing is via the steering gate 600, as more particularly described above.

In operation, the information memory IM is written into sequentially every 125 microseconds (every frame) and loads PCM data from each of the 3 sets of 24 channels plus the dummy tone group, for a total of 96 time slots. The data is multiplexed from the 3 A/D converters and the tone group in a sequential fashion (i.e., 0, 1, 2, 3, 0, 1, 2, 3, etc.). Since the whole information memory IM is loaded with new PCM data from each of the 96 time slots every 125 microseconds, each time slot is 1.3 microseconds. The 125 microsecond rate corresponds to an 8KHz sampling rate required for the PCM data to reproduce a 4KHz signal. Reading of the information memory IM is controlled by the control memories CA and CB via their associated steering gate 1001, and these memories also cycle at the 125 microsecond rate.

More particularly, as indicated above, the time slot operation is divided into four divisions by the B and C pulse decodes. The overall operation is to write PCM code into the information memory IM during the first quarter of a time slot corresponding to the time slot counter 402 and then read out during the second and third quarters of a time slot corresponding to the control memory CA and CB addresses, respectively, and finally to compare these codes and to output the least larger of the two codes which is actually the largest PAM sample. The information memory IM therefore undergoes a write and two read operations every time slot. The WRITE address is cyclic and corresponds to the S1, S2, C1, C2, C4, C8 and C16 pulses from the time slot counter 402. The READ addresses are read from the control memories CA and CB and are steered to the information memory IM during the second and third quarters of a time slot, respectively. The WRITE addresses and the READ addresses are gated to the information memory IM via the steering gate 600.

As can be seen in FIGS. 6 and 7, the WRITE addresses and the READ addresses function to select two of the 12 memories forming the information memory IM, and the address location within the selected two of the 12 memories. The WRITE or the READ address is gated through the steering gate 600, under control of the B-O and C-O pulses from the time slot counter 402 which are coupled to the NAND gate 603 whose output is coupled to the select leads of the gates comprising the steering gate 600.

In those cases where PCM code is to be written into the information memory IM, the PCM code is coupled via the PCM bus and the leads designated PCM IM (the leads S-1, 0-1, 1-1 and 2-1 and the leads 3-1, 4-1, 5-1 and 6-1) to the inputs of the different memories forming the information memory. The PCM code is written into the information memory IM when the signal WRITE I-1 is true, and this signal becomes true on the coincident occurrence of the QA-1 and PE-O pulses at the input to the NAND gate 604. The WRITE I-1 signal is coupled through the inverters 605 and 606 to provide the signals WRITE I(A)-O and WRITE I(B)-O signals to enable the respective groups of memories forming the information memory IM.

The data read from the information memory IM corresponding to the control memory CA is the PCM code of a speaker A, and is stored in a temporary buffer 750, on the rise of the QC-1 pulse. The data read from the information memory IM corresponding to the control memory CB address is the PCM code of a speaker B, and is stored in a temporary buffer 752, on the rise of the QD pulse. Both addresses are read from the control memories CA and CB using the time slot counter 402 for its address, as more fully described below.

Figure 8:
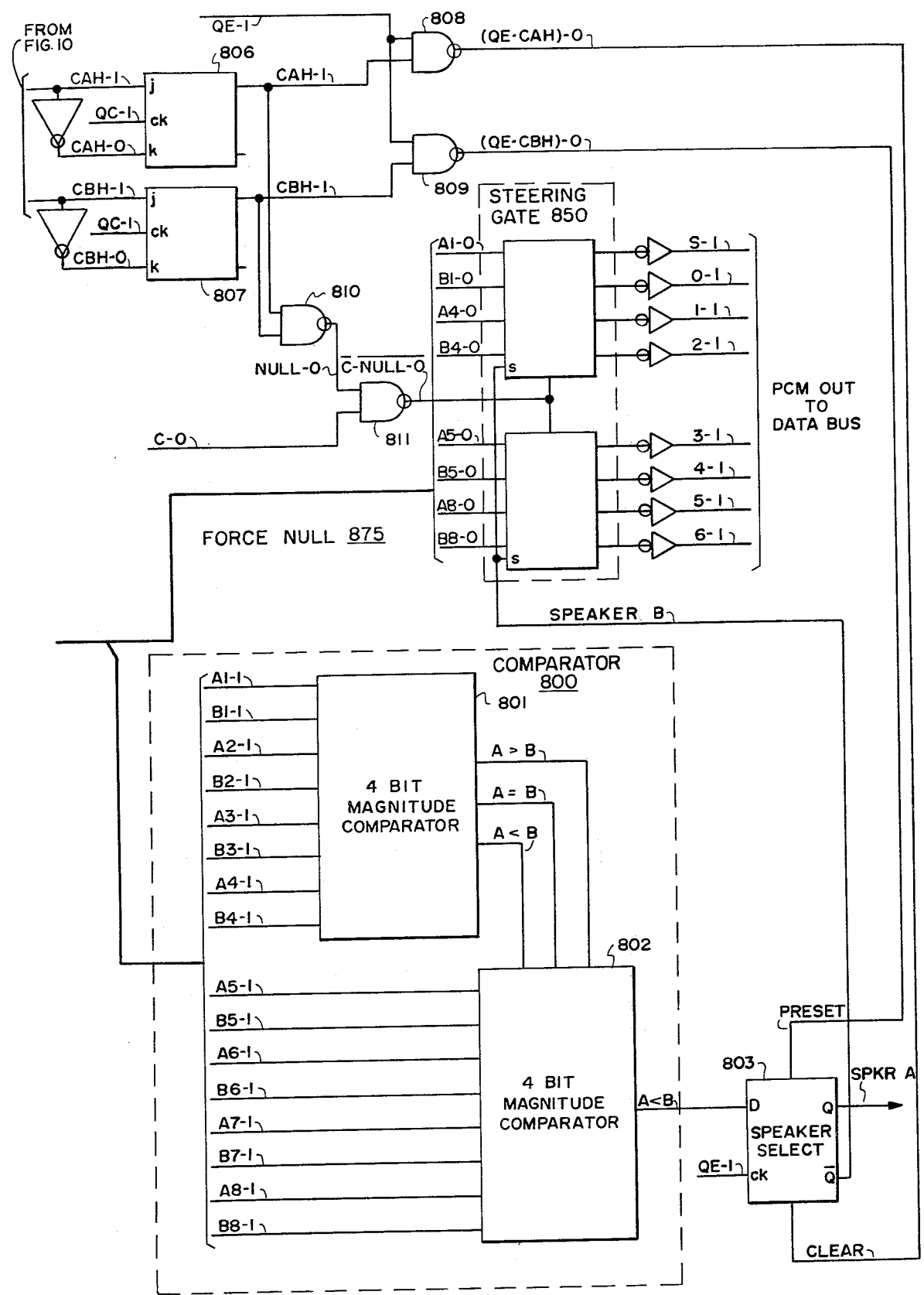

Comparator Circuit 800 (FIG. 8)

With reference to FIGS. 7 and 8, it can be seen that the outputs of the temporary buffers 750 and 752 are coupled to and compared by a comparator 800. The result or output of the comparator 800 will set a speaker select flip-flop 803 if the speaker A's code is less in magnitude than speaker B's code. This means speaker A had a larger PAM sample than speaker B. The output of speaker select flip-flop 803 will steer speaker A's code out to the PCM peripherals. This is valid only until the next QC pulse rises since the temporary buffer 751 will be loaded again. The speaker select flip-flop 803 will not set if speaker B's PCM code is to be outputed. The speaker select flip-flop 803 is set on the rise of the QE pulse. It may be noted that during time slot 96, no QC, QD or QE pulse occurs so the speaker's PCM code of time slot 95 is retained until time slot 0, Also, reading address 96 of the control memories CA and CBhas no effect so that the 96th address can be read out to the information memory IM but it is not written into.

The comparator 800 may be formed of two type 7485 4-bit magnitude comparators connected such as to set the speaker select flip-flop 803 if the speaker A's code is less in magnitude than that of speaker B.

Pulses are also provided by the control memories CA and CB to indicate that a speaker is on "hold" and should not be chosen to get the PCM code of the corresponding control memory CA or CB address of this time slot. As can be seen in FIG. 8, a force null circuit 875 is provided, and these hold bits or pulses set a hold flip-flop 806 or 807 associated with that speaker, to select the other speaker, i.e., the hold flip-flop 806 will force the speaker select flip-flop 803 to be reset to force speaker B regardless of the code value. If both of the hold bits from the control memories CA and CB occur, the speaker select flip-flop 803 is undetermined, but logic is provided to disable both inputs to the steering gate 850 from being sent out. The result is a null or quiet code of all one's being sent out, which will be converted to the minimum positive PAM value.

More particularly, outputs of the temporary buffers 751 and 752 are coupled both to the comparator 800 and to the respective inputs of the steering gate 850. If, as indicated above, the speaker A's code is less in magnitude than that of speaker B, the speaker select flip-flop 803 is set and speaker A's code is gated through the steering gate 850 to the PCM peripherals. If the speaker select flip-flop 803 is not set, its output gates the steering gate 850 to gate speaker B's code through the steering gate 850 to the PCM peripherals.

The hold bits or pulses CAH and CBH are coupled to the hold flip-flops 806 and 807, and are operable to set these hold flip-flops if a speaker is on "hold". The outputs CAH-1 and CBH-1 from the hold flip-flops 806 and 807 are coupled to NAND gates 808 and 809, respectively, and both are coupled to a NAND gate. During the occurrence of the QE-1 pulse, if either signal CAH-1 or CBH-1 is true, the speaker select flip-flop 803 is operated to select the other speaker. Alternatively, if both signals CAH-1 and CBH-1 are true, the speaker select flip-flop 803 is undetermined. However, the NAND gate 810 is enabled and its output is coupled to the NAND gate 811. This latter gate 811, during the C-O pulse, is enabled and, in turn, disables both inputs to the steering gate 850. As a result, a null or quiet code of all 1's is sent out to the PCM peripherals.

Figure 9:
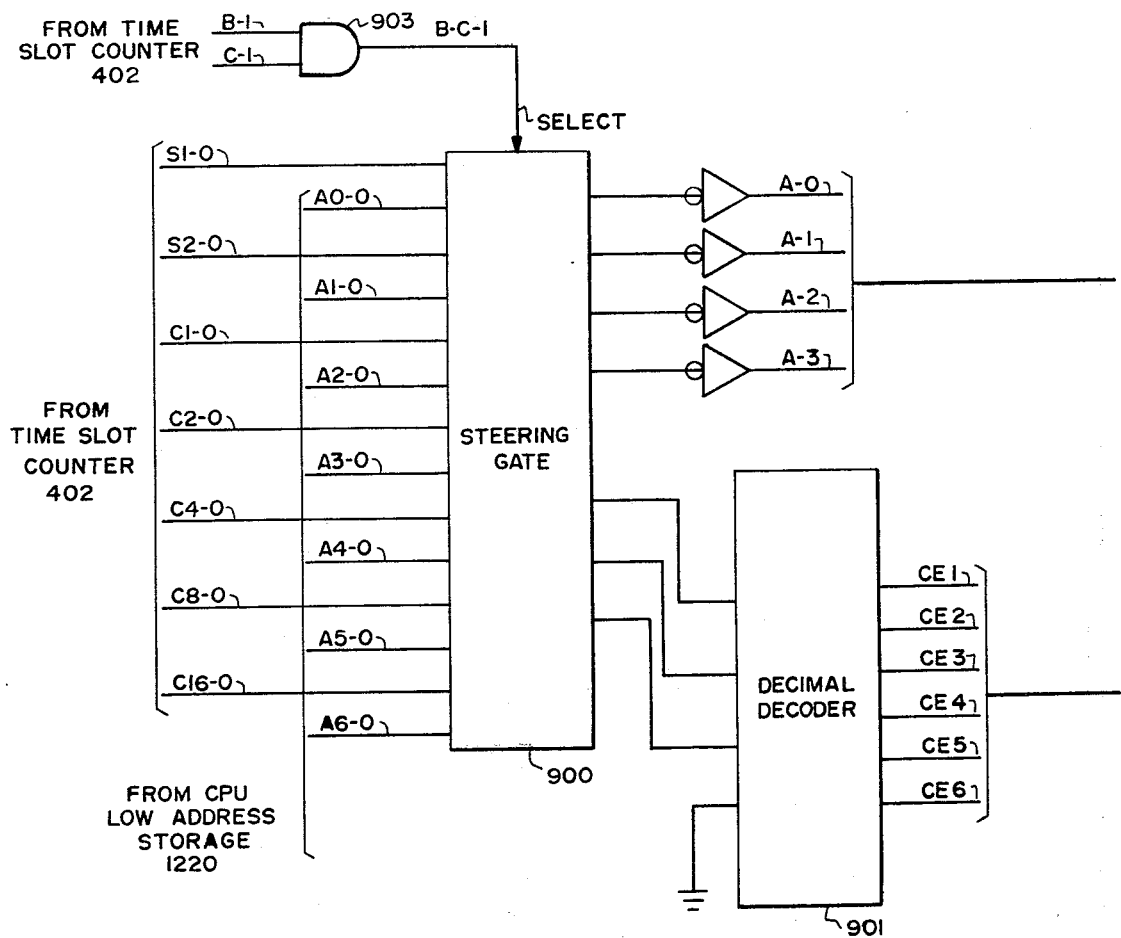
FIGS. 9 amd 10, when assembled as illustrated in FIG. 21, illustrate the control memories, the steering gate for accessing them, and the steering gate for outputting data from the respective ones of the control memories, of the system of FIGS. 2 and 3.

Steering Gate 900 (FIG. 9)

As indicated above, the output of the time slot counter 402 is coupled to both the steering gate 600 described above and to the steering gate 900. The steering gate 900, like the steering gate 600, may be formed of type 74157 quadruple 2-input data selector/-multiplexers connected and operated to select one or the other of the two groups of inputs coupled to the steering gate 900. In this case, the one group of inputs comprises the outputs of the time slot counter 402, and the other group comprises the address outputs from the CPU low address circuit 1220 (FIG. 12).

As in the case of the steering gate 600, the inputs S1, S2, C1 and C2 and the inputs AO, A1, A2 and A3, when gated through the steering gate 900, define respectively an address location within the control memory CA and/or CB. The inputs C4, C8 and C16 and the inputs A4, A5 and A6, when gated through the steering gate 900, are coupled to a BCD to decimal decoder 901 which may be, for example, a type 7442 decoder, to select two of the 12 type 7489 read/write memories which make up the control memory CA or CB, described more fully below.

Figure 10:
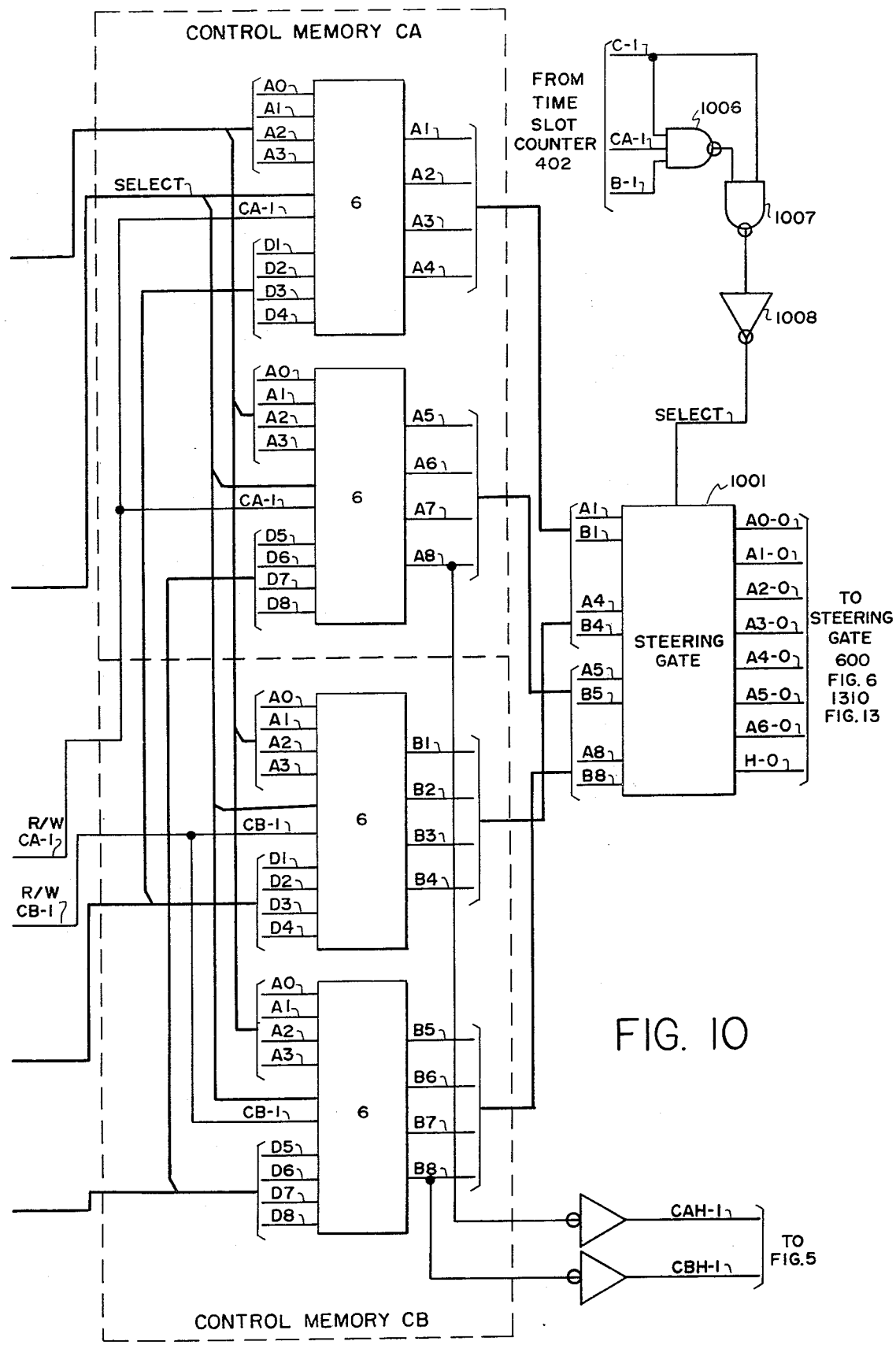
Figure 11:
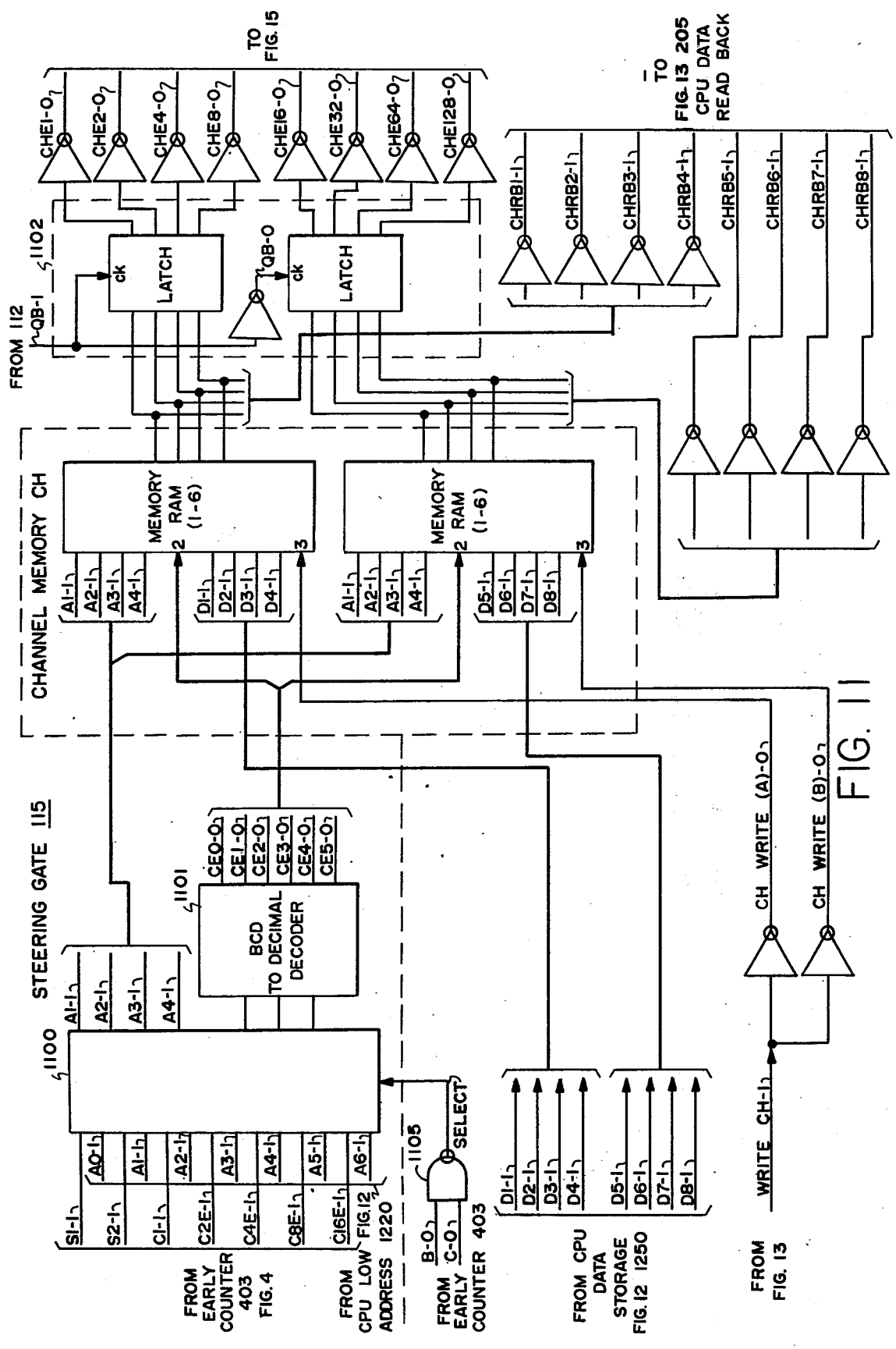
FIG. 11 illustrates the channel memory, the steering gate for accessing it, and the channel identity latches at its output, of the system of FIGS. 2 and 3.

Control Memories CA and CB (FIG. 10)

The control memories CA and CB both are 96 word memories of 8 bit words, and each stores the addresses of the information memory IM and a hold bit. In the illustrated embodiment, each of the control memories CA and CB is formed of 12 type 7489 read/write memories connected so as to form one 96 × 8 memory. Each of these control memories CA and CB is written into and read out by selection two of the 12 read/write memories and by then addressing a location within those selected memories. As indicated above, the selection and addressing is via the steering gate 900, as more particularly described below.

The control memories CA and CB are used for storing the time slot identities of the two or more time slots in communication with one another. In other words, since any time slot must be able to "talk" to another, the control memories CA and CB allow for storage of which time slots are in communication. For each time slot, the information memory IM stores the PCM data and the control memory CA and CB stores and gives the address of some other time slot from which the present time slot will receive data. Only the control memory CA or CB is required for two party conversations, with the other being provided for conferencing or to insert tones on to a conversation.

As indicated above, the selecting and addressing of the control memories CA and CB is via the steering gate 900. The data or time slot identities to be written into the control memories CA and CB is provided to them by the CPU data storage 1210 for the call processor unit CPU, while the reading and writing of these control memories CA and CB is controlled by the CPU control 1200. The data read from the control memories CA and CB is coupled to a steering gate 1001 which is operable to couple the output of either the control memory CA or CB to the steering gate 600 and a steering gate 1310.

More particularly, as indicated above, the operation is slaved to the operation of the information memory IM for normal time switch operation. During every time slot during the absence of the B and C pulses which are coupled to an AND gate 903 whose output selectively enables the steering gate 900, an address defined by the outputs from the time slot counter 402 is gated through the steering gate 900 to select one address location or word of the control memories CA and CB to be read back to the information memory IM, via the steering gates 1001 and 600. The output of both the control memories CA and CB is available for three quarters of every time slot (i.e., except during the occurrence of the B and C pulses), and these outputs are coupled to the steering gate 1001. This steering gate 1001, described more fully below, is gated to allow the data output from the control memory CA to be sent out to the steering gates 600 and 1310 for the first half of a time slot (i.e., during the $\bar{C}$ pulse). During the following or next quarter of that time slot, the steering gate 1001 is gated to send out to the data read from the control memory CB to the steering gates 600 and 1310. The data outputs of the control memories CA and CB contain the time slot identities or numbers which correspond to the addresses of the information memory IM, and the above-described hold bits CAH and CBH.

During the fourth quarter of each time slot, the steering gate 900 is gated to steer the addresses from the CPU low address storage 1220 to the control memories CA and CB, so that these control memories CA and CB can be updated by the CPU. The data for updating these memories CA and CB are coupled to them from the CPU data storage 1210, via the leads designated D1-1 through D8-1, during the CPU write operation as described above in the description of the central processor unit or CPU operation.

Steering Gate 1001 (FIG. 10)

As indicated above, the outputs of the control memories CA and CB are coupled to the steering gate 1001. This steering gate 1001 may be formed of type 74157 quadruple 2-input data selector/multiplexers connected and operated to select either the outputs from the control memory CA or CB. The selection is controlled by the output pulses from the time slot counter 402, and the selected outputs are coupled to the steering gates 600 and 1310.

More particularly, the outputs of the control memories CA and CB both are coupled to the steering gate 1001, so that one or the other of these outputs can be selectively dated through the steering gate 1001. The pulses C, B and CA from the time slot counter 402 all are coupled to a NAND gate 1006 whose output is coupled to another NAND gate 1007 together with the C pulse from the time slot counter 402. The output of the NAND gate 1007 is inverted by an inverter 1008 and coupled to the select input of the steering gate 1001. As described above, the logic is such that the steering gate 1001 is gated to allow the data output from the control memory CA to be sent out during the first half of a time slot (i.e., during the $\bar{C}$ pulse), and the data output from the control memory CB to be sent out during the following or next quarter of that time slot.

Steering Gate 1100 (FIG. 11)

The steering gate 1100 controls the input of data to the channel memory CH, and is operable to selectively couple the outputs S1, S2, C1, C2E, C4E, C8E and C16E from the early counter 403 or the outputs A0-A6 from the CPU low address storage 1220. This steering gate 1100 can be formed of, for example, type 74157 data selector/multiplexer.

As in the case of the steering gates 600 and 900 described above, the inputs S1, S2, C1 and C2E, and the inputs A0-A3 are operable to select two of the 12 memories comprising the channel memory CH for accessing. The inputs C4E, C8E and C16E, and the inputs A4-A6, are operable to select or identify an address location within the accessed two of the 12 memories, via the output of the BCD to decimal decoder 1101. The steering gate 1100 is selectively enabled by the B and C pulses from the early counter 403 which are coupled to a NAND gate 1105. The output of this NAND gate 1105 is coupled with the select input of the steering gate 1100. With this logic, the steering gate 1100 is switched during the last three quarters of a time slot (i.e., during the B and C pulses) to gate an address from the CPU low address 1220 to the channel memory CH. The data for updating the channel memory CH during this time is coupled to it from the CPU data storage 1250, via the leads designated D1-D8. This data is not written into the channel memory CH until the signal WRITE CH-1 occurs, and this signal occurs only during the last quarter of a time slot. A read operation is assumed if no WRITE CH-1 pulse occurs.

Channel Memory CH (FIG. 11)

The channel memory CH, as can be seen in FIG. 11, is a 96 word memory of 8 bit words, and provides for control of which terminal equipments are allotted which channels, on a per call basis. In the illustrated embodiment, the channel memory CH is formed of 12 type 7489 read/write memories connected so as to form one 96 × 8 memory. The channel memory CH is written into or read out by selecting two of the 12 read/write memories and by then addressing a location within that selected memory. The selection and addressing is via the steering gate 1100, as described above. Each of the 96 locations within the channel memory stores the associated equipment identity of the equipment which has been allocated that channel. The control of the channel memory CH (Data update) is performed by the CPU when connections are established or removed. The channel memory CH also constantly is cyclically read and the equipment is given a channel transmit and receive pulse as long as its identity is stored in the channel memory CH. The distribution of these pulses is actually a decode of the read out of the channel memory CH, with the decode being stored external to the channel memory for a specified time. Each equipment decodes this data to see if it corresponds to its identity. If it does, that equipment is enabled as long as the storage contains its identity.

More particularly, during operation, every frame (125 microseconds) the early counter 403 receives a pulse ERESET-O, followed 11.05 microseconds later by a pulse RESET-O (See FIG. 4). This allows the early counter 403 to run two channels (8 time slots) ahead of the time slot counter 402. The reason for the early counter 403 running ahead of the time slot counter 402 is because a timing problem exists since there is a delay from the time the terminal equipment is enabled until the PCM code is available to the time switch or information memory IM. This delay corresponds to the time required by the A/D converters to convert the PAM code to PCM. In view of this delay, the channel memory CH must rum ahead of the time switch information memory IM by that time. Also, the receive pulse must be delayed from when the PCM is available from the time switch information memory IM to when the PAM sample is available for the D/A converters. Since this conversion time is fixed, the receive delay also is fixed with respect to the transmit delay (the sum of both). Therefore, instead of having a second channel memory for the receive pulses, the transmit pulse is locally delayed to become that terminal equipment's receive pulse.

With reference to FIG. 11, the channel memory CH is sequentially read under control of the early counter 403, as the latter's outputs are coupled through the steering gate 1100. The data read from the channel memory CH is coupled to and stored in a channel storage latch 1102 which may be formed of, for example, type 74175 flip-flops. This data is stored in the latch 1102 on the rising edge of the pulse QB-1, and is available to channel enable circuits of the terminal equipments for 1.3 microseconds.

The data read from the channel memory CH also is coupled to the steering gate 1310, and through the latter to the buffers 1343 and hence to the CPU data read back circuit 1300. The data stored in the buffers 1343 is gated to the CPU data read back circuit 1300 by the signal RPL-1, described above under the operation of the CPU.

The channel memory CH also is randomly read or written under request from the CPU. This random access of the channel memory CH, however, is by address only, and only during the last quarter of any time slot.

On such a request from the CPU, the address to be accessed is coupled from the CPU low address 1220 to the steering gate 1100. The address is gated from the steering gate 1100 during the last quarter of any time slot, but the steering gate 1100 actually is switched during the occurrence of the B and C pulses which are coupled to the NAND gate 1105 which selectively operates the steering gate's select input. The condition (B+C) defines the last three quarters of a time slot, but the signal WRITE CH-1 is gated with a pulse (CPU WRITE SB-1, FIG. 13) which occurs during the last quarter of the time slot. A read operation is assumed if no write pulse occurs.

If a write pulse (WRITE CH-1) occurs during the last quarter of the time slot, the data to be written into the channel memory CH is coupled from the CPU data storage 1210 to the channel memory CH via the leads designated D1-D8. The data written into the channel memory CH corresponds to a binary coded equipment identity.

Figure 14:
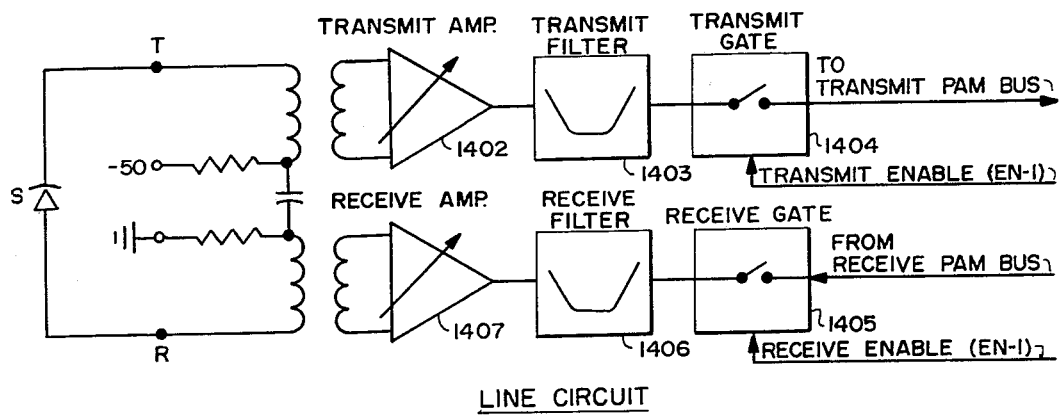
FIG. 14 illustrates a typical line circuit in the system of FIGS. 2 and 3.

Line Circuit (FIG. 14)

In FIG. 14, a typical line circuit is illustrated, and the trunk circuits are of generally the same configuration. The analog information from a subscriber S is amplified by a transmit amplifier 1402 and then filtered by a filter 1403 before being coupled to the transmit gate 1404, from where it is coupled to a 24 channel PAM bus to an A/D converter (FIGS. 2 and 3). The A/D converter accepts the 24 channel PAM bus, and outputs an 8-bit binary representation for each PAM sample. The information from all such A/D converters is multiplexed to form a single PCM bus (PCM IN) to the information memory IM. Correspondingly, the output PCM information on the PCM bus to the D/A converters is demultiplexed into separate 24 channel buses for the D/A converters, which convert the PCM into individual PAM samples on the PAM buses. The PAM samples are received by the appropriate line or trunk circuits, via the receive gate 1405. After being filtered by a filter 1406 and then amplified by an amplifier 1407, an analong waveform is coupled to the subscriber S. In this respect, the operation is conventional PCM Operation, and may be as described in the article entitled "Second Generation-Toll-Quality PCM Carrier Terminal", by L. Deane Crawford, appearing in the April, 1972 *GTE Automatic Electric Technical Journal*. The transmit gates 1404 and the receive gates 1405 are enabled by transmit enable and receive enable pulses, to couple the analog signals to the PAM buses, as is conventional practice.

Figure 15:
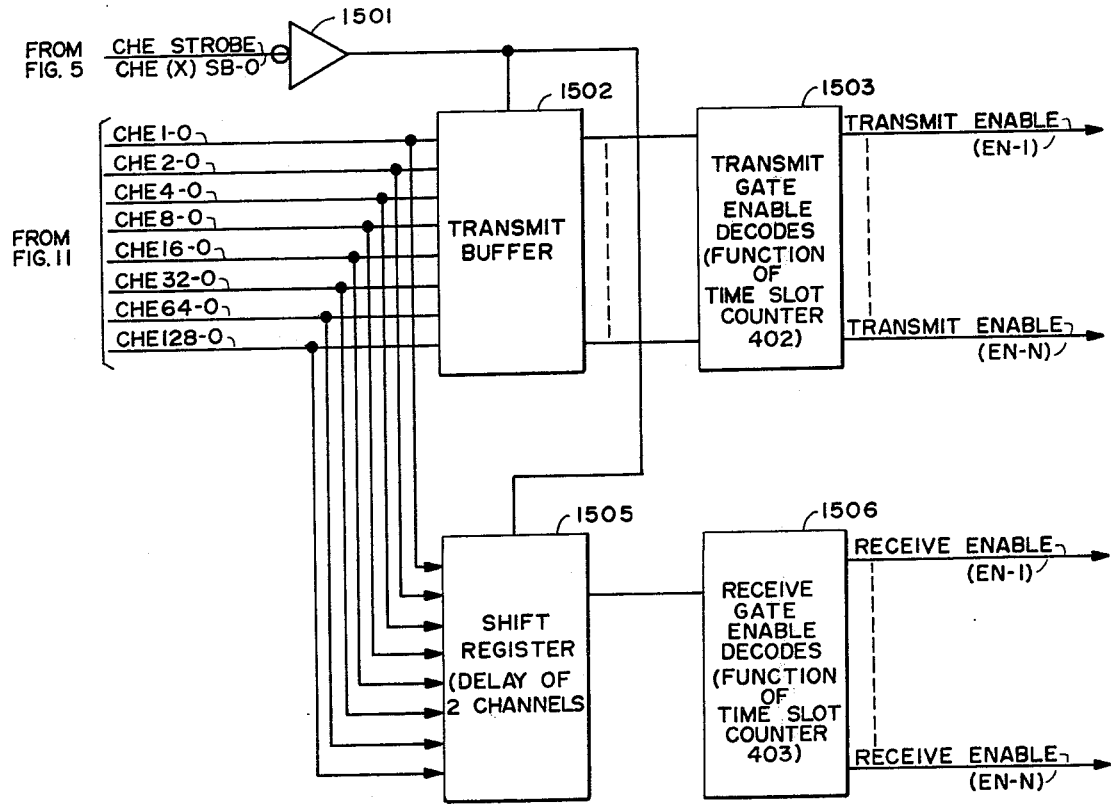
FIG. 15 illustrates a typical line termination in the system of FIGS. 2 and 3.

Line Interface (FIG. 15)

In the illustrated embodiment, the line (or trunk) interfaces include means for enabling the transmit and receive gates, such as the gates 1404 and 1405, to allocate the line or trunk circuits to the available channels. A typical line interface is illustrated in FIG. 15.

As described above, the equipment identity is stored in the channel memory CH, and is read out and stored in the channel identity latches 1102. From the latter, the identity signals (CHE1-0 through CHE128-0) are coupled to a transmit buffer 1502 within the respective line interfaces. The identity signals then are coupled to a transmit gate enable decode circuit 1503 which decodes these identity signals to provide transmit enable (EN-1 through EN-N) which are coupled to an enable the respective ones of the transmit gates, such as the transmit gate 1404. The appripriate one of the transmit buffers 1502 is gated by the CHE STROBE pulse (CHE (x) SB-O generated by the control logic 550, in the manner described above, to couple the identity signals to the transmit gate enable decode circuit 1503. In this fashion, the groups of channels are sequentially accessed. and the appropriate one of the line (or trunk) interfaces is operated to provide the transmit enable pulse to the transmit gates 1404 of the indicated one of the line (or trunk) circuits.

These same identity signals are coupled to a shift register 1505 which delays outputing them to a receive date enable decode circuit 1506. For reasons described more fully above, this delay corresponds to two channels (or eight time slots). This delay is created by shifting the identity on the occurrence of each strobe. The receive gate enable decode circuit 1506 operates from the C output of the shift register 1505 which is the identity shifted twice on two channels later. The receive gate enable decode circuit 1506 provides receive enable pulses to the receive gates 1405 of the line (or trunk) circuits, in the manner described above.

Method of Operation - CPU (Call Set Up and Release)

If a line to line connection is to be established, the CPU must write twice into the channel memory to assign channels to each line, and twice into the control memory CA to permit each line to hear the other, all in the manner described above. The CPU therefore must address the network four times to set up the connection. Assume that the lines are on separate PAM buses, since the time slots are assigned generally as follows:

Group 0 time slots – 0, 4, 8, 12, etc.
Group 1 time slots – 1, 5, 9, 13, 17, etc.
Group 2 time slots – 2, 6, 10, 14, 18, etc.
Group 3 time slots – 3, 7, 11, 15, 19, etc.

Again, assume that the CPU assigns the first channel to each line since they are on separate PAM buses, e.g., bus 0 and bus 1. This means that one line is assigned time slot 0 and the other is assigned time slot 1. The time slot and all memory addresses are numbered from 0 through 95, as described above. The CPU then writes the first line's address or identity into the first word of the channel memory CH (time slot 0), and the other line's address or identity into the second word of the channel memory (time slot 1). Writing these identities into the channel memory CH provides for generaltion of these line's PAM samples and conversion to PCM coded samples to the information memory IM, as described above. The lines also are enabled to receive PCM coded samples from the information memory IM. The time switching will be done once the CPU writes into the control memory CA.

The first word of the control memory CA will contain time slot 1, and the second word will contain time slot 0. Therefore, time slot 0 will receive time slot 1's PCM coded sample, and time slot 1 will receive time slot 0's PCM coded sample. In other words, the first line will hear the second line, and the second line will hear the first line, since their repsective PCM coded samples are switched in time. It is assumed that the system has written all other memory locations of the CA, CB and CH memory to 255 (i.e., 1111 1111).

Using the above connection for purposes of description, the operation during conversation is as follows. During time slot 88, the first word of the channel memory CH is read, since the read out of the channel memory CH is controlled by the early counter 403 which runs eight time slots ahead of the time slot counter. The address of the first line circuit is stored in the channel identity latch 1102 until time slot 92, and is decoded by the channel enable circuit in the line interface (i.e., the transmit buffer 1502 and the transmit gate enable decode circuit 1503). The decode enables that line circuit's transmit gate 1404, and a PAM sample appears on the PAM bus 0. The A/D converter of bus 0 stores this PAM sample.

During time slot 89, the second word of the channel memory CH is read and is stored in the channel identity latch 1102, until time slot 93. The address of the second line, upon being decoded, enables the second line's transmit gate 1404. The PAM sample from the second line is sent out on the PAM bus 1. The A/D converter of bus 1 stores this PAM sample.

The first line's PCM sample is coded to PCM by the A/D converter 0 during time slots 92–95, and the second line's PAM sample is coded to PCM by the A/D converter 1 during time slots 93, 94, 95, 96 and 0. The inherent delay of the A/D converters in converting the PAM samples to PCM is two channels of which one is used to store the sample, and the second is used to code the stored sample. It is also noted that the operation of the A/D converter of bus 0 and 1 occur concurrently, except for an offset of one time slot or one quarter of a channel. This offset is controlled by the control logic 550, as described previously, and in particular, channel shift register 555.

During time slot 0, the first line's PCM sample is stored in the information memeory IM and is the result of A/D converter O's coding process. The second line's sample, which was stored during the last frame (125 msec. before, during time slot 1) is "time switched" by the previously described operation which occurs every time slot. In this case, the control memory CA will be read to gate time slot 1, which resides in the first word of the control memory CA from the previous mentioned CPU write operation, to address the information memory IM. This results in that PCM code being sent to the D/A converter PCM RCV bus shown in FIG. 2. The control memory CB has the hold bit on and forces the gating of that PCM code since gate 807 will set from CBH-1 forcing gate 803 to set. Also note that the identity needed for time slot 8's PCM to be written into the information memory IM is outputed during time slot 0 as was line 1's identity during time slot 88.

During time slot 1, the second line's PCM sample is stored in the information memory IM, and is the result of the A/D converter 1's coding process. The first line's PCM sample which was just stored during time slot 0 is now "time switched" since the second word of the control memory CA contains time slot 0. This PCM code is sent out on the D/A converter PCM RCV bus shown in FIG. 2.

The D/A converter of bus 0 stores the first PCM code by way of the control logic 550 in a typical demultiplexing fashion and converts it to PAM to be outputed on PAM bus 0 (time slot 2 and 3).

The D/A converter of bus 1 stores the next PCM code which occurs on the PCM RCV bus by way of the control logic 550 again to demultiplex this bus data and converts it to PAM to be outputed on PAM bus 1 (time slots 3 and 4).

The PAM sample of BUS 0 is received by the first line circuit during time slot 2 and 3. It's identity has been shifted twice (time slot 92 and 0) to result in a receive enable pulse from gate 1506 decoding the C output of the shift register 1505 associated with bus 0.

Likewise, the PAM sample of bus 1 is received by the second line circuit during time slot 3 and 4 which has resulted from its identity being shifted twice (time slots 93 and 1) in gate 1505 and decoded by gate 1506 associated with bus 1.

This sequence will occur every frame to allow the two lines to talk together. To remove this connection the CPU will write 256 (1111 1111) into the two channel memory CH locations (time slot 0 and 1) and the two control memory CA locations (time slot 0 and 1).

It can be seen that the same operation could have occurred using time slots 4 and 5 instead of 0 and 1, respectively.

Also, it can be seen that the control memory CB and be used along with nine CPU write operations to generate a 3-way connection.

Now that the invention has been described, what is claimed as new and desired to be secured by Letters Patent is.

1. In a pulse code modulated communication system having
   a. a plurality of terminations;
   b. a plurality of channels, each of which is assigned a time slot;
   c. an information memory for storing information from each of the plurality of channels, the transmit side of each of the plurality of channels appearing in a fixed location on one side of the information memory and the receive side of each of the plurality of channels appearing in a fixed location on the other side thereof,
   d. a control memory having a control memory word corresponding to each of the plurality of channels for storing the address location within the information memory of the channel to which that channel is to be connected for conversation, and
   e. control means for cyclically controlling the operation of the system, said control means during a time slot assigned to a channel writing the information from that channel into the information memory. reading the control memory word corresponding to that channel from the control memory to address the information memory to read out the information stored therein at the addressed location, and to transmit the information read therefrom to that channel, to thereby permit that channel to engage in conversation with another channel, the improvement comprising:
   f. channel allocating means for allocating said channels to said terminations on a per call basis; and
   g. a channel memory having channel memory words corresponding to each of the plurality of channels for storing the address of the termination allocated that channel;
   h. said channel memory being cyclically read and the addressed termination being activated to transmit to or receive information from said information memory;
   i. a second control memory having a control memory word corresponding to each of the plurality of channels for storing the address location within the information memory of a second channel to which that channel is to be connected for conversation, and
   j. a comparison means for comparing a transmitting as an output thereof the larger of two samples of information coupled to it,
   k. said control means during a time slot assigned to a channel writing the information from that channel into the information memory, reading the control memory words corresponding to that channel from each of the control memories for addressing the information memory to read out the information stored therein at the two addressed locations, and to transmit the information to said comparison means, the largest of the two samples of information coupled to said comparison means being coupled to that channel,
   l. whereby 3-way conferencing between the plurality of channels can be provided.

2. The pulse code modulated communication system of claim 1, wherein the number of terminations exceeds the number of available channels, whereby the common equipment required for a specified number of terminations can be substantially reduced by allocating the available channels to the terminations on a per call basis.

3. The pulse code modulated communication system of claim 2, wherein said terminations each comprises a transmit and a receive gate enabled respectively by a transmit pulse and a receive pulse, said transmit and receive pulses being derived by decoding the read out of said channel memory.

4. The pulse code modulated communication system of claim 1, wherein one of said control memories controls the normal network connections and the other one thereof controls any additional connections necessary for conferencing.

5. The pulse code modulated communication system of claim 1, wherein said information memory is written cyclically and read at random, and said control memories are read cyclically and written at random.

6. The pulse code modulated communication system of claim 1, further comprising a clock including a time slot counter for controlling the operation of said information memory and said control memories, and an early counter slaved to said time slot counter and arranged to run ahead of said time slot counter to enable said transmit gates associated with said terminations such that the PCM information is available to said information memory.

7. The pulse code modulated communication system of claim 1, wherein said channel memory is cyclically read and said terminations are enabled as long as its identity is stored in said channel memory.

8. The pulse code modulated communication system of claim 1, wherein said terminations each comprises a transmit gate and a receive gate, said transmit and receive pulses being derived by decoding the rear out of said channel memory.

9. The pulse code modulated communication system of claim 8, wherein there is a delay from the time said transmit pulse is coupled to said terminations until PCM information is available to said information memory, said channel memory being read out ahead of said information memory to provide said transmit pulse by a time corresponding to said delay.

10. The pulse code modulated communication system of claim 9, wherein there is a delay from the time when PCM information is available from said information memory to said terminations, said receive pulses to said terminations being delayed by a time period corresponding to said delay, whereby said receive gates associated with said terminations are enabled by said receive pulses to receive said PCM information only when said PCM information is available.

11. The pulse code modulated communication system of claim 10, wherein said transmit pulses are locally delayed to become the receive pulses for said terminations.

12. The pulse code modulated communication system of claim 1, further including a speaker selection means coupled to and operated by said comparison means, said speaker selection means normally being in a first state to gate the sample of information from one of said channels as an output to a channel, said speaker selection means being set to a second state by said comparison means to gate the sample of information from the other one of said channels as an output to a channel if the magnitude of the sample of information from said other one of said channels is less than that of said one of said channels.

13. The pulse code modulated communication system of claim 12, further including a first and a second speaker hold means, said control memory words of said pair of control memories including a hold bit which indicates a speaker is on "hold" and is not to receive the sample of information from the other one of the two addressed locations in the information memory, said hold bits being coupled to said first and second speaker hold means to set one or the other thereof, said first and second speaker hold means upon being set operating said speaker selection means to gate the sample of information from one of said speakers regardless of the magnitudes of the samples of information from said two addressed locations.

14. The pulse code modulated communication system of claim 13, further including logic means for disabling said speaker selection means and for providing a null code output to said termination if said hold bits from said pair of control memories both occur.

* * * * *

UNITED STATES PATENT AND TRADEMARK OFFICE
CERTIFICATE OF CORRECTION

PATENT NO. : 4,007,338
DATED : February 8, 1977
INVENTOR(S) : Donald W. McLaughlin It is certified that error appears in the above—identified patent and that said Letters Patent are hereby corrected as shown below:

column 27, line 32, ". (period)" should be --, (comma)-- column 27, line 57, "a" second occurrence should read -- and --.

column 28, line 43, "rear" should be --read--

Signed and Sealed this

Twelfth Day of April 1977

[SEAL]

Attest:

RUTH C. MASON
*Attesting Officer*

C. MARSHALL DANN
*Commissioner of Patents and Trademarks*